United States Patent
Bagga et al.

(10) Patent No.: US 10,284,916 B2
(45) Date of Patent: May 7, 2019

(54) PERSONALIZED MENUS AND MEDIA CONTENT INTERFACE

(71) Applicant: Comcast Cable Communications, LLC, Philadelphia, PA (US)

(72) Inventors: Amit Bagga, Basking Ridge, NJ (US); Larry Cynkin, Chevy Chase, MD (US); Jan Neumann, Arlington, VA (US); Hassan Sayyadi-Harikandehei, Washington, DC (US); Ehsan Younessian, Washington, DC (US); Mevan Samarasinghe, Washington, DC (US); Brian Curtis, Washington, DC (US); Muthu Manickam, Aldie, VA (US); Oliver Jojic, Annandale, VA (US); Jeanine Heck, Narberth, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/547,363

(22) Filed: Nov. 19, 2014

(65) Prior Publication Data

US 2016/0142783 A1 May 19, 2016

(51) Int. Cl.
| | | |
|---|---|---|
| H04N 21/45 | (2011.01) | |
| H04N 21/472 | (2011.01) | |
| H04N 21/845 | (2011.01) | |
| H04N 5/445 | (2011.01) | |
| H04N 21/482 | (2011.01) | |

(Continued)

(52) U.S. Cl.
CPC ... *H04N 21/47214* (2013.01); *H04N 5/44543* (2013.01); *H04N 21/26258* (2013.01); *H04N 21/4532* (2013.01); *H04N 21/4583* (2013.01); *H04N 21/4668* (2013.01);

(Continued)

(58) Field of Classification Search
None
See application file for complete search history.

(56) References Cited

U.S. PATENT DOCUMENTS

| | | | |
|---|---|---|---|
| 2003/0020744 A1* | 1/2003 | Ellis | H04H 60/31 |
| | | | 715/723 |
| 2005/0216942 A1* | 9/2005 | Barton | H04N 7/17318 |
| | | | 725/97 |

(Continued)

FOREIGN PATENT DOCUMENTS

| | | | | |
|---|---|---|---|---|
| EP | 2464138 A1 * | 6/2012 | | H04H 60/37 |

*Primary Examiner* — Cai Y Chen
(74) *Attorney, Agent, or Firm* — Banner & Witcoff, Ltd.

(57) ABSTRACT

Methods and apparatus for generating personalized menus and a media content interface are provided. In one example, different device specific media asset lists are generated at different user devices for the same user based on the media consumption history at each device. In another example, media asset listings are displayed for multicast and on-demand media assets determined to be of interest to the user. An on-demand media asset is listed at a time when no other multicast media assets are listed. In another example, media asset listings for successive episodes of a media series are displayed in sequential order in response to an input to view successive episodes of a media series. In another example, a text search for media content is performed in which the search priority of media provider results is decreased relative to the search priority of media asset results as additional characters are added to a search string.

20 Claims, 18 Drawing Sheets

(51) Int. Cl.
*H04N 21/458* (2011.01)
*H04N 21/262* (2011.01)
*H04N 21/466* (2011.01)
*H04N 21/8355* (2011.01)

(52) U.S. Cl.
CPC ..... *H04N 21/4821* (2013.01); *H04N 21/4828* (2013.01); *H04N 21/8355* (2013.01); *H04N 21/8456* (2013.01)

(56) References Cited

U.S. PATENT DOCUMENTS

2012/0054211 A1* 3/2012 Arsenault .......... H04N 5/44543
　　　　　　　　　　　　　　　　　　　　　707/755
2016/0080815 A1* 3/2016 Ruffini ............... H04N 21/4755
　　　　　　　　　　　　　　　　　　　　　725/46

* cited by examiner

| For You | Movies | TV Shows | Kids | Sports |
|---|---|---|---|---|
| For The Foodies | | | | |
| CAKE BOSS | CHOPPED | IRON CHEF AMERICA | KITCHEN NIGHTMARES — 310 | barefoot contessa |

Your Top Tense Suspense/Thriller Movies

| | | | | |
|---|---|---|---|---|
| MEMENTO | HANNIBAL | AMERICAN PSYCHO | BATTLE ROYALE | silence of the lambs |

More Like Kitchen Nightmares — 346 / 342

| | | | | 352 |
|---|---|---|---|---|
| RAMSAY'S BEST RESTAURANT | MasterChef | HELL'S KITCHEN | HOTEL HELL — 350 | TOP CHEF |

| | 5 pm | 5:30 pm | 6 pm | 6:30 pm | 7 pm |
|---|---|---|---|---|---|
| David's Channel | Breaking Bad | Breaking Bad | Breaking Bad | Breaking Bad | Breaking Bad |
| FOX | Judge Judy | Divorce Court | FOX News at 6 | Inside Edition | TMZ |
| CBS | The Bold & The Beautiful | CBS Evening News | Eyewitness News at 6 | ET Entertainment Tonight | The Insider |
| HBO | Girls | Entourage | Girls | Real Time with Bill Maher | Real Time with Bill Maher |
| AMC | Breaking Bad | Breaking Bad | Comic Book Men | The Walking Dead | The Walking Dead |
| On Demand 1 | The Borgias | The Borgias | Friends | Game of Thrones | Game of Thrones |

Favorites
HD Only
Movies
Sports
Kids

FIG. 5C

PERSONALIZED MENUS AND MEDIA CONTENT INTERFACE

BACKGROUND

Many media content user interfaces, such as electronic program guides, present program information in a non-personalized manner. Conventional media content interfaces require the viewer to interact with a static program guide that contains an overwhelming amount of media information for programming from multiple media sources, including several media content that the user has no interest in viewing. Viewers typically spend a considerable amount of time searching through such media interfaces to locate the content that they are interested in. There remains an ever-present need for a personalized media content interface that is tailored to present customized media recommendations in a manner that allows the viewer to easily view media content of interest to them in a more dynamic and user friendly format.

SUMMARY

The following summary is for illustrative purposes only, and is not intended to limit or constrain the detailed description.

Some of the features described herein relate to providing a display of an interface comprising a user consumption schedule. The user consumption schedule may identify a plurality of content items that a user has requested and corresponding times at which the plurality of content items will be multicast. In response to identifying one or more empty timeslots in the user consumption schedule and determining that one or more content items of interest to the user are available on demand, the one or more content items may be scheduled in the one or more empty timeslots. In some embodiments, the one or more content items may be selected by monitoring user consumption of content at each of a plurality of different user devices. The content selection may further comprise selecting different content items to list in user consumption schedules of the different user devices such that the content items listed in each user consumption schedule are based on content that has been consumed at a corresponding user device.

In some embodiments, the one or more content items determined to be of interest to the user may be identified by performing a media search. A plurality of characters of an input search string for the media search may be received. A relative weighting may be determined between media providers and media assets for the media search based on a determination of whether a character count of the plurality of characters exceeds a predetermined number. The media search may be conducted such that the media providers and media assets are weighted, respectively, based on the relative weighting. In response to a determination that a number of characters in the input search string is less than a predetermined number of characters, search results for the media providers may be ordered for display before search results for the media assets.

In some embodiments, the user consumption schedule may be modified in response to receiving a user request to add a new content listing to the user consumption schedule. A content listing for a first content item, originally scheduled to be viewed by the user when the first content item is multicast, may be moved to a new timeslot occurring after a time at which the first content item is multicast. A recording instruction may be issued to record the first content item when the first content item is multicast for future consumption. In some embodiments, the user request may comprise a request to view one or more episodes of a recurring series of episodes corresponding to the first content item.

In some embodiments, a first content item in the user consumption schedule may be identified as an episode of a recurring series of episodes. One or more unwatched episodes preceding the first content item in the recurring series of episodes that the user has not already consumed may be identified. Content listings for the one or more unwatched episodes may be generated at one or more timeslots that are prior to a scheduled consumption time of the first content item in the user consumption schedule. The one or more unwatched episodes may be scheduled in one or more timeslots that precede a timeslot at which the first content item is scheduled for consumption.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 3A-B illustrate exemplary screen displays of personalized menus on a user media interface usable with features described herein.

FIGS. 5A-C and 6 illustrate various exemplary screen displays and interface elements usable with features described herein.

DETAILED DESCRIPTION

Figure 1:
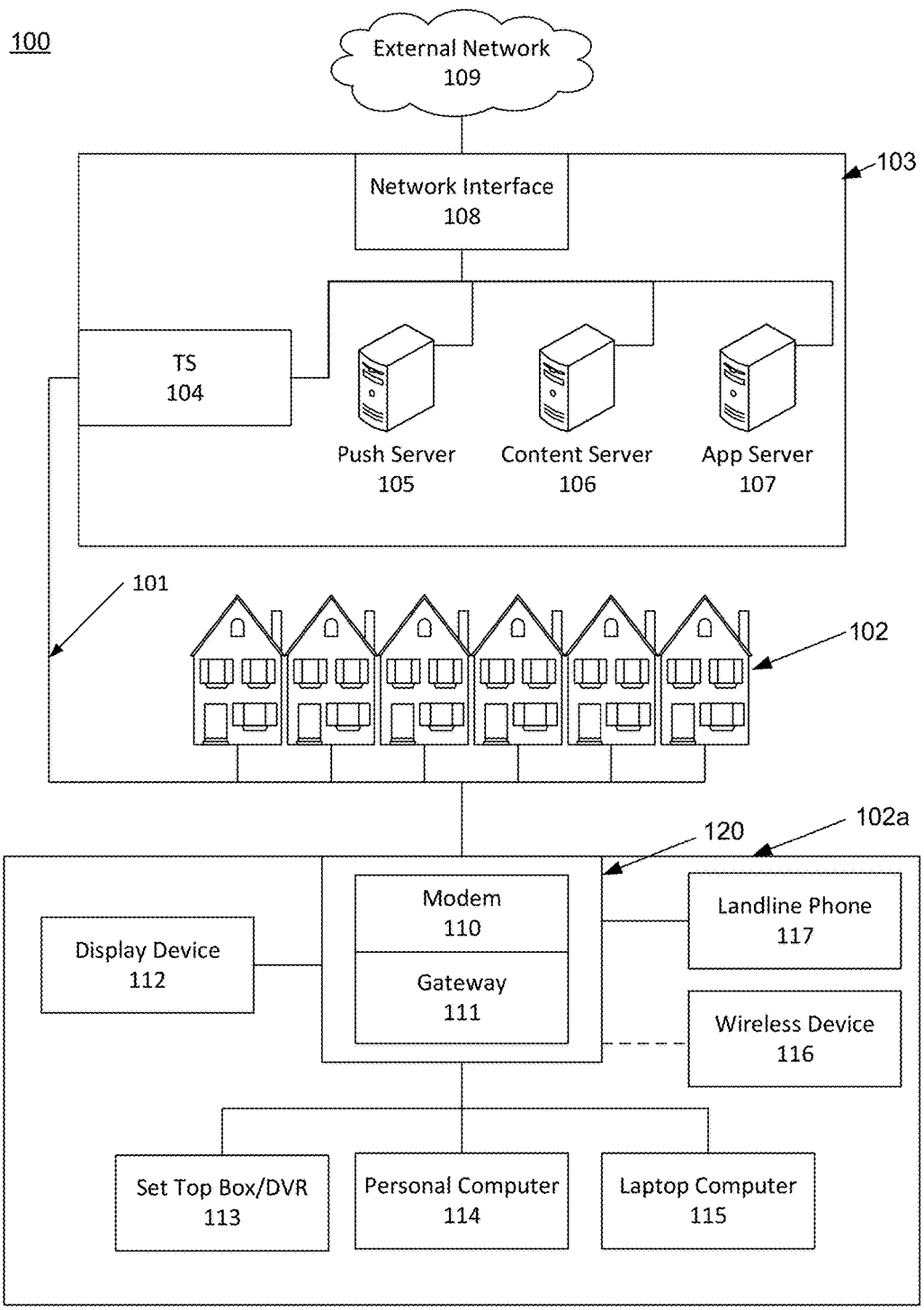
FIG. 1 illustrates an example communication network on which various features described herein may be used.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

The present disclosure describes several features of a personalized media content user interface, also referred to as a personalized media interface or a personalized user interface herein. Media content assets may be recommended to users based on the users' past media consumption patterns and/or preferences in personalized media asset menus, personalized virtual channels, and/or personalized media guides. In such a personalized user interface, the presentation of media content recommendations may be organized with attention to which device the content is presented on, the time of day, user profile, location, how much similar content has already been presented, etc. For example, if a user tends to watch more crime dramas on their big-screen television, and more children's shows on their tablet computer, then the system herein may tailor recommendations for those devices accordingly (e.g., recommending more crime dramas to the big-screen television viewer, and more children's shows for the tablet viewer). Media content is recommended upon reaching a high level of confidence that the user will be interested in the recommended time at the time the recommendation is made.

The personalized media interface may include customized menus or lists of media content of interest to a viewer of a device on which the personalized media interface is displayed. Past consumption history at the device and/or the users associated with the device may be monitored to tailor customized menus with content that will likely be of high interest to users of the device on which the personalized media interface is displayed. Media consumption history may be monitored at a device to track the type of content users of the device prefer to watch at specific times of day and/or the week. For example, the system may determine that users of a living room television prefer to watch cartoons in the afternoon and news programs in the evening. Personalized menus may be generated for media content related to attributes that users are mostly likely to find interesting. Personalized menus may be filtered and displayed in an order based on degree of user interest. The personalized media interface may also actively prevent the display of media assets and/or menus that are too similar to the ones that are already displayed. For example, the system may have generated one recommendation list of programs that are similar to a crime drama television show that a user watched, and another recommendation list of programs that are similar to a crime drama theatrical movie that the user watched, and the system may determine that the two lists are too similar to show both to the user. To more efficiently use the display interface, the system may choose to only display one of these two similar lists.

In addition to presenting media recommendations in personalized menus, the personalized media interface may also include media asset listings in a customized schedule. Such a customized schedule may customize display of personalized virtual channels to include media assets from a plurality of media sources based on a determination of what the user will be interested in watching at the device that the media interface is displayed on. The user may further customize the media assets that are displayed in such dynamic personalized virtual channels. For example, the system may provide the user with a grid-based program guide or schedule, and one of the listed channels or services may actually be a collection of programs from various sources, such as traditional scheduled programs from a plurality of sources (e.g., NBC, HBO, etc.), on-demand programs and programs on the user's digital video recorder (DVR). For example, the user's program guide may include a customized listing for an "action drama" channel, and the listing may schedule an evening's programming that includes "action drama" programs scheduled for transmission or broadcast that evening (e.g., a 9 pm episode of "Game of Thrones" on HBO and a midnight broadcast of the movie "True Lies" on NBC), together with playback of recorded programs from the user's DVR for the time between the scheduled broadcasts of "Game of Thrones" and "True Lies."

The personalized virtual channels in the user's media program guide may also be configured to allow a user to modify the arrangement of media asset listings displayed in the media guide. For example, the user may be allowed to interact with the media guide grid to add, remove, and/or replace media asset listings from virtual channels in the media guide grid. The user may be allowed to select a media asset listing for a series episode and enable an option to watch all available episodes of the show in succession, herein referred to as "binge watching." The personalized media guide may allow the user to catch up on a selected program series. For example, when the user selects the "binge watch" option on a selected media asset listing in a virtual channel of the program guide grid, media asset listings for all available episodes of a program that the user has not watched may be listed in succession in a program guide and replace the previously assigned media asset listings in the virtual channel.

The personalized media interface may also allow a user to search for media assets. The search feature may be a predictive text or audio search that adds higher weight to media asset search results based on local airtime, freshness of media content, media content recommendations, and/or popularity of content amongst similar viewers. The predictive search feature may also initially prioritize media sources above media assets in search results. For example, the system may dynamically run searches as the user inputs letters for a text search (e.g., as the user types in "Fox" the system runs a search for "F" after the first letter, then a search for "Fo" after the second letter, then a search for "Fox" after the third letter, continuing on as the user types more letters, each time displaying the list of search results). In those dynamic searches, the weighting given to possible hits may be varied depending on the number of letters that the user has entered for the search term. For example, for the first three letters that the user enters, media sources (e.g., "HBO," "ESPN," "FOX," etc.) may be given a greater weight in the search, so in the example of a search using the text string "Fox," the television station "Fox Sports One" and the movie "Fox and the Hound" may both satisfy the search for "Fox," but the television station "Fox Sports One" would be weighted higher because it's a television station, so in the search results the "Fox Sports One" television station would be listed before "Fox and the Hound." However, if the user keeps typing letters, and adds a space after "Fox," then the television station would not be weighted as much in the next search, and the next search results may list "Fox and the Hound" ahead of "Fox Sports One" as a result.

In some embodiments, the system may generate different media recommendations, different media schedule guide displays, different media asset lists displays, and even different text search results for different display devices. Multiple user accounts may be signed in at each display device for each of the users consuming media content and browsing personalized media interface at each display device. Accordingly, each display device may generate media recommendations, media schedule guide displays, media asset lists displays, and/or text search results based on the composite preferences and composite user media consumption patterns and history of all of the users consuming content at that display device.

In some embodiments, the system may generate different media recommendations, different media schedule guide displays, different media asset lists displays, and even different text search results for different display devices having the same user account. Each user profile may separately track user consumption history and maintain a separate set of media preferences for each display device, even for the same user account. For example, the system may maintain separate user consumption history and preferences for a parent's tablet device than his bedroom television, and accordingly recommend different media content to each of these devices.

In some embodiments, the personalized media interface may be generated for display at a mobile device to be used as a remote control for another display device in communication with the mobile device. For example, the personalized media interface may be displayed on a father's smartphone to control what media assets are displayed on several different display devices that the smartphone is in communication with, such as a living room television, the parents' bedroom television, and the father's personal tablet device. When the user activates the personalized media interface on his mobile device, the mobile device may ask which display device is going to be controlled by the mobile device. The personalized media interface generated for display at the mobile device will be customized to display media recommendations, media schedule guide displays, media asset lists displays, and even text search results customized based on the media consumption history and preferences associated with the display device selected. Therefore, selecting to control the living room television will generate different media recommendations, different media schedule guide displays, different media asset lists displays, and even different text search results on the personalized media interface displayed on the mobile device than if the father's bedroom television was selected to be controlled on the mobile device.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or a headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, for example, a termination system (TS). More specifically, the interface 104 may be a cable modem termination system (CMTS), which may be a computing device configured to manage communications between devices on the network of links 101 and backend devices such as computing devices 105-106 and application server 107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-106 and application server 107 that may be configured to perform various functions. For example, the local office 103 may include a push notification computing device 105. The computing device 105 may generate push notifications to deliver data and/or commands to the various premises 102 in the network (or more specifically, to the devices in the premises 102 that may be configured to detect such notifications). The local office 103 may also include a computing device 106, which may be a content server. The computing device 106 may be one or more computing devices that are configured to provide content to users at their premises. This content may be, for example, video on demand movies, television programs, songs, text listings, etc. The computing device 106 may include software to validate user identities and entitlements, to locate and retrieve requested content, to encrypt the content, and/or to initiate delivery (e.g., streaming) of the content to the requesting user(s) and/or device(s). Indeed, any of the hardware elements described herein may be implemented as software running on a computing device.

The local office 103 may also include one or more application servers such as application server 107. The application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements and providing personalized media content recommendations in the personalized media interface. Yet another application server may be responsible for formatting and inserting advertisements in a video stream being transmitted to the premises 102. Although shown separately, one of ordinary skill in the art will appreciate that computing devices 105, 106, and/or the application server 107 may be combined. Further, here the computing devices 105, 106, and the application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
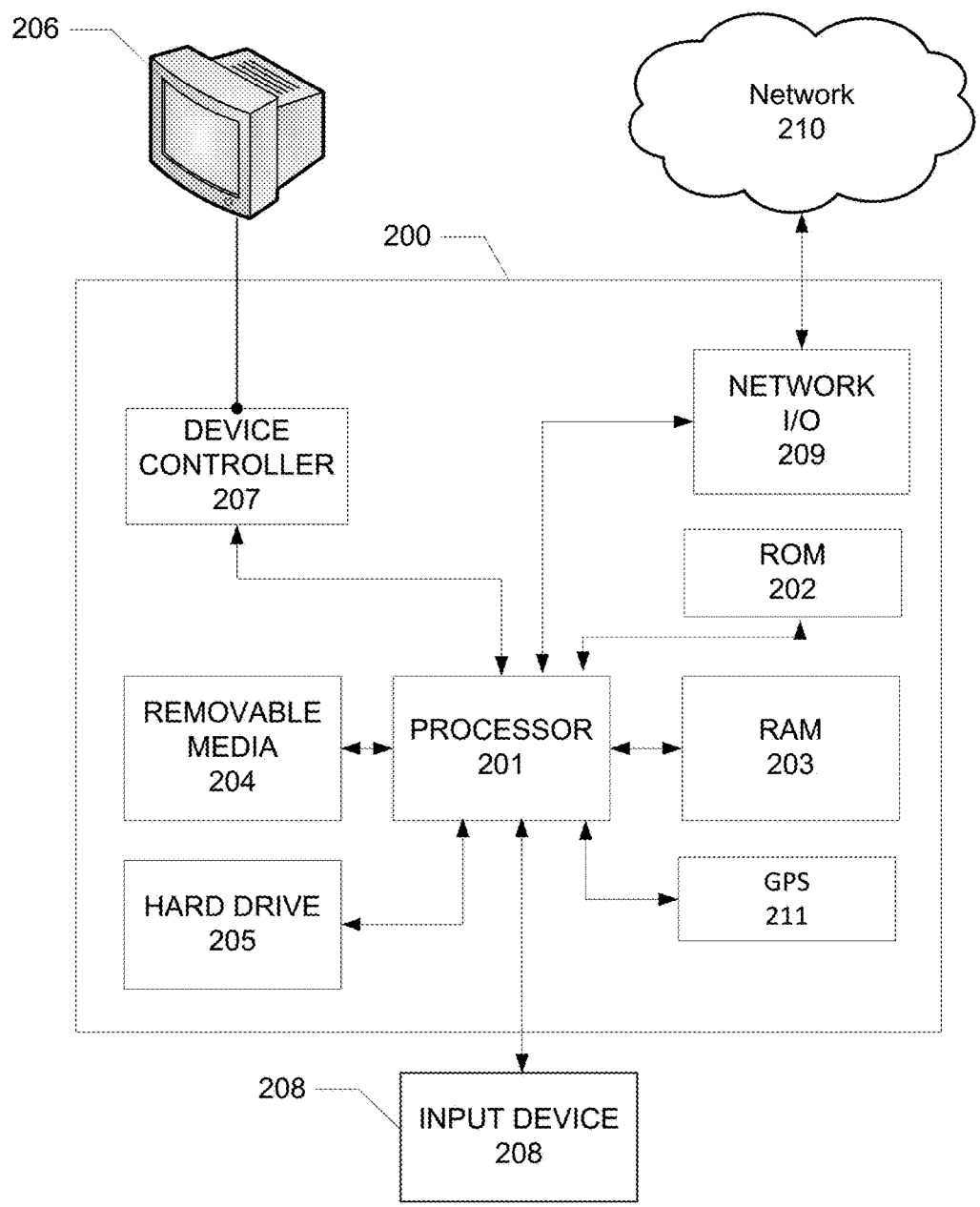
FIG. 2 illustrates an example computing device that can be used to implement any of the methods, servers, entities, and computing devices described herein.

FIG. 2 illustrates general elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network I/O circuit 209 may be a wired interface, wireless interface, or a combination of the two. In some embodiments, the network I/O circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

In some embodiments, the personalized media interface may be generated for display by processor 201 at the computing device 200, which may correspond to a device local to a user, such as set-box 113 as referenced in FIG. 1. In other embodiments, the personalized media interface may be generated at an application server 107 at a headend 103 as referenced in FIG. 1. In other embodiments, portions of the personalized media interface may be generated at both an application server 107 at headend 103 and for display by processor 201 of the computing device 200.

The personalized media interface may be displayed at display 206. The processor 201 may instruct device controller 207 to generate such a display at display 206. The processor 201 may receive user input to the personalized media interface from input device 208. The processor 201 may process the user input and implement subsequent features of the personalized media guide to such received user input. The processor 201 may store user media consumption history, media preferences, and/or user profile information in a memory unit such as ROM 202, RAM 203, or hard drive 205. The processor 201 may additionally identify any media content stored on hard drive 205 or removable media 204 and incorporate such locally stored media content into the personalized media guide. If such locally stored media content is requested for playback through the personalized media interface, the processor 201 may retrieve such locally stored media content from the removable media 204 or the hard drive 205 and display the locally stored media content on the display 206.

Additionally, the device may include a location-detecting device, such as a global positioning system (GPS) microprocessor 211, which can be configured to receive and process global positioning signals and determine, with possible assistance from an external server and antenna, a geographic position of the device. The GPS microprocessor 211 may transmit the determined location of the user of computing device 200 to processor 201. The processor 201 may then use the determined location to further tailor the personalization of the media interface. For example, the processor 201 may identify users in the same location as the user of computing device 200 that have similar tastes as the user of the computing device 200 based on viewer consumption history data obtained from an application server 107. The processor 201 may generate content recommendations for the personalized media interface displayed at display 206 based on the preferences of the identified similar users.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., the processor 201, the ROM storage 202, the display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3A:
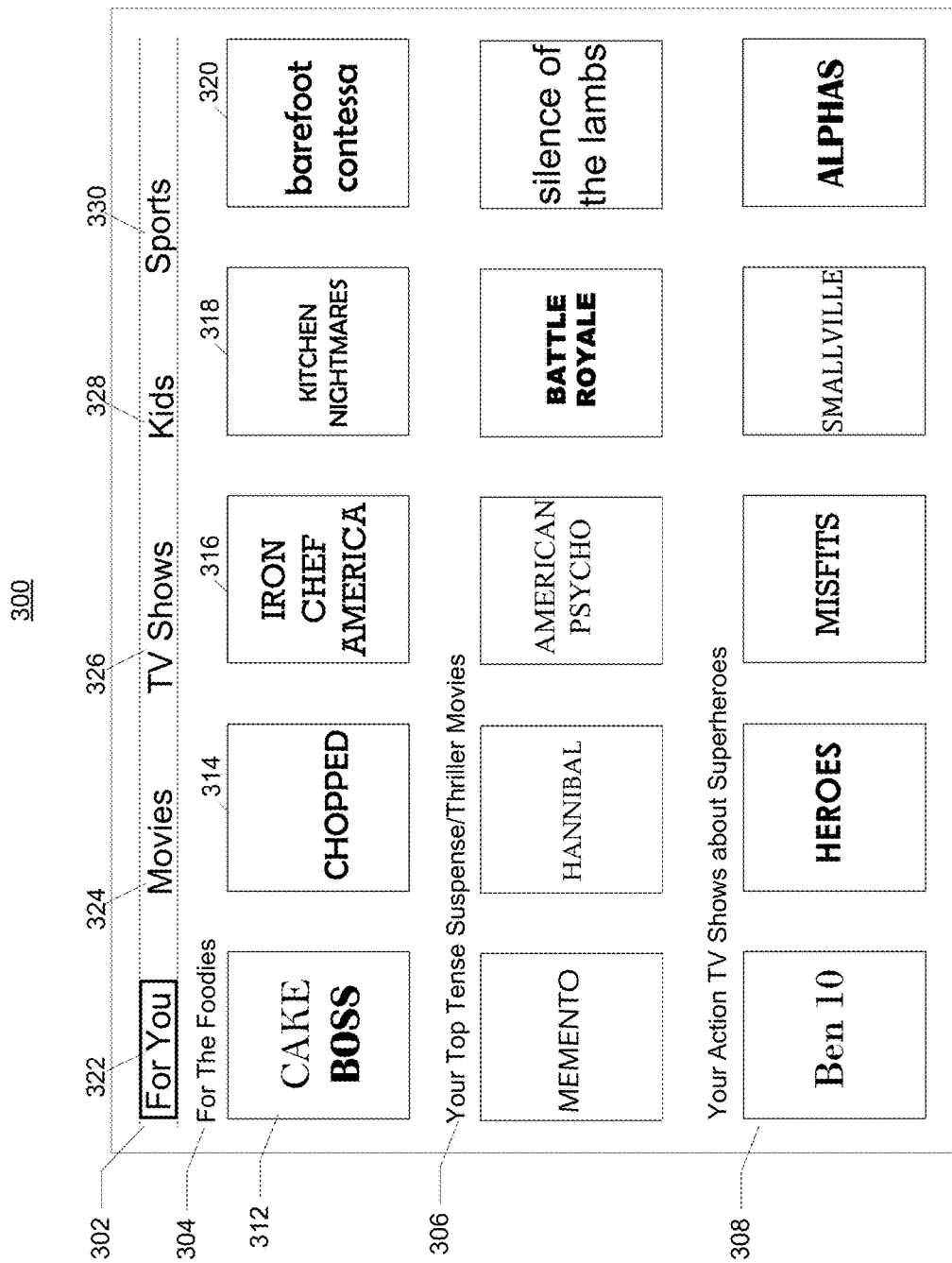

FIG. 3A illustrates a screenshot of a personalized media interface 300 displaying a personalized menu. The personalized media interface 300 may displayed as the initial screen on a display device, such as display 206 of FIG. 2, once a user input is issued to initiate display of a personalized media interface. Alternatively or additionally, display of the personalized media interface 300 may be triggered by a user option to view personalized content menus. The personalized media interface 300 may include several different menus, several or each of which may be customized to include media assets that are determined to be of high user interest based on the monitored media consumption at the display device.

The personalized media interface 300 may include a menu selection panel 302 that lists different recommendation menu options 322, 324, 326, 328, and 330. Each recommendation menu option may include a page of different categories of menus determined to have a similar theme. For example, recommendation menu option 322 may correspond to a page of personalized media asset menus. The recommendation menu option 324 may correspond to a page of media asset menus containing movie menus. The recommendation menu option 326 may correspond to a page of media asset menus containing television show menus. The recommendation menu option 328 may correspond to a page of media asset menus containing children's programming menus. The recommendation menu option 330 may correspond to a page of media asset menus containing sports programming menus.

In the example of the personalized media interface 300, the "For You" recommendation menu option 322 may be selected and accordingly, personalized menus 304, 306, and 308 may be displayed in the personalized media interface 300. Personalized menus may be generated based on the user's interests. Content consumption patterns (i.e., content preferences, recently consumed media content, etc.) at computing device 200 may be monitored and the personalized media interface 300 may be tailored to display personalized menus determined to be of interest to the user(s) of device 200. Each personalized menu may contain multiple media asset listings for media assets that share or more common attribute (i.e., genre, tone, theme, actor, rating, etc.). For example, menu 304 is a personalized menu containing media assets 312, 314, 316, 318, and 320 related to cooking television shows. Menu 306 is a personalized menu containing listings for suspense and/or thriller movies with a tense tone. Menu 308 may contain media asset listings for television shows with a genre of action and/or a theme of superheroes. Accordingly, a computing device may generate menu 304 by including media assets that include a tag indicating that the assets are cooking television shows, the common attribute. The computing device 304 may further account for a specific user's media consumption preferences and media consumption patterns by selecting media assets corresponding to the common attribute for a given menu that are determined to be of high user interest. For example, the computing device may generate the cooking television menu 304 by populating it with cooking television shows that the computing device determines the user would be most interested in over other cooking television shows. When the decision is made by the computing device to display menu 304 based on the user's navigation of the media guide, the preassembled menu 304 is displayed to the user.

In some embodiments, several different menus may be generated for a common attribute. For example different menus for cooking television shows may be generated, with different combinations of cooking television shows. The cooking television show menu that is displayed to the user at a given device may be displayed based on the media preferences of the device's user and the monitored user consumption history at the given device. Consumption data from each display device is analyzed to determine which one of the cooking television show menus is to be displayed at the given display device.

The media asset menus displayed in personalized media interface 300 may be preassembled with media content listings that the user(s) at the device will be interested in before the user requests to view a personalized menu page. Upon monitoring the media preferences and media consumption history of users(s) at a media device, menus or media asset lists having menu categories that correspond to search queries that the user(s) are most likely to input into the media interface of that given device may be identified for display at the media device. The menu categories that are identified by predicting user search queries may be device specific. For example, the computing device may identify more family based programming menu categories for a living room television than it would for a parents' bedroom television or a father's personal tablet device. The computing device may monitor that more family based movies are viewed on and searched for in the living room television. Accordingly, the computing device may identify different family movie based menu categories for the living room television and retrieve media asset lists for such identified programming for display at the living room television.

In some embodiments, the media asset lists may be generated for specific media devices based on the monitored consumption history at such media devices. For example, the computing device may identify that the user consumes several humorous children's movies about animals at the living room television and accordingly may generate media asset lists having a category with a composite attribute of humorous children's movies about animals. However, the computing device may also determine that the same user consumes crime drama television shows at his bedroom television and not at the living room television and accordingly may generate media asset lists having the menu category of crime drama television shows for display only at the bedroom television and not at the living room television.

Some media asset lists may only require media assets to be associated with one attribute for inclusion into these lists while certain other lists require media assets to match two or more different attributes to be included into these certain other lists. For example, certain media asset lists may have a menu category having a single media attribute such as the menu category titled "More From Brad Pitt." Other media asset lists may have a menu category with multiple media attribute such as the menu category titled "Humorous Children's Movies about Animals." Media assets may be determined to be a match with a certain attribute related to the predetermined search query if the media asset includes a tag or metadata identifier for that particular attribute. Media asset tags may be searched to find media assets matching all of the media attributes in the identified menu category.

In some embodiments, media asset lists may be populated with media assets that were already being recommended to the user. Media assets being recommended to a user at one device may be recommended to the user at a different device in a different media asset list. Media content matching the attributes identified by the predetermined search queries may be further filtered based on media consumption history at a user device to populate media asset lists with media assets determined to be of interest to the viewers of the device on which the personalized media interface is displayed. Media assets may be assigned a score based on the users' media browsing and/or consumption history (i.e., same genre, tone, actor, rating etc.). For example, user consumption of media assets may be monitored to determine the type of media content that the user has a preference for at a given device. There may be an additional level of media consumption granularity by tracking the type of media content that the user has a preference for during a certain time of day and week. Media assets that are consumed by the user and/or the media assets related to such consumed assets may be assigned a score based on the number of times a user has consumed and browsed for the particular media asset and/or its related assets. Such scores may be stored as metadata associated with each particular media asset. Such user consumption score metadata may be continuously updated as the user consumes more content. Alternatively or additionally, user consumption scores related to media assets may be stored in a separate database from the media asset. A media asset list may select media assets for inclusion only if the consumption scores associated with the media asset exceed a minimum threshold value to ensure user interest in the media asset list.

In some embodiments, media recommendations may be generated by weighting recent consumption history at a given device more heavily than user preferences and media consumption history from a more distant past. The computing device may identify menus having menu categories corresponding to the types of content that the user has been watching more recently at the user device. For example, the system may determine that the user has been more interested in watching more television shows for teens about high school than children's cartoon television shows at the living room television. Accordingly, the system may populate the living room television display with more menus related to television shows for teens about high school than children's cartoon television shows. By consistently monitoring the user consumption and weighting recent consumption more heavily than past consumption trends, the system may provide recommendations that the user would be more interested in viewing.

Media content recommendations for a particular user, used either in populating a media asset list with media assets or for other purposes, may factor in popularity of content among other users that are determined to have similar media preferences as the particular user. Users with similar media preferences as a particular user may be identified by a server, such as the application server 107 of FIG. 1, by monitoring user media consumption and/or browsing histories of several individual subscribers. By identifying which media content that particular users like and dislike, whether the users like certain media content at the same times of day or week, whether the users prefer to watch certain types of media content on a certain device, a computing device may identify which users have similar media preferences and tastes as other users on a per device basis. Once users with similar media preferences are identified, a computing device may identify media content that is popular and/or of high interest to users with similar media preferences as a particular user and the identified media content may be recommended to the particular user. In another embodiment, media content identified as being popular and of high interest to similar users may be assigned a high recommendation weight. Such a recommendation weight may be paired with the user consumption and/or browsing history score for a particular user at a given device to generate a complete recommendation value for the given device. Media assets with the highest recommendation value may be recommended to individual particular users at the given device. This manner of pairing user consumption scores of users with the consumption scores of similar users may allow for media content recommendations to factor in the media preferences of similar users while still ensuring that such content recommendations would be of interest to the user that recommendations are being provided to at the given device. Factoring in content that is popular with other users into the recommendation for a given user may allow the given user to be recommended content that the given user may like to view at the given device but would not have otherwise discovered.

In some embodiments, media content recommendations may be generated by locating media from a variety of different media sources and media services. Media content that is recommended to a user may be retrieved from a plurality of sources and services such as streaming music services, streaming video services, Internet on demand media services, television networks, video on demand, a user's digital video recorder (DVR) or other local storage, online radio stations, and/or digital media stores. Each of these services and media sources maintains its own tags and/or metadata for media content. Media content tags from each of these sources and services may be collected and compared by a headend server such as the application server 107 or a local user device such as the set top box 113 of FIG. 1. Similar media content tags from the plurality of services and sources may be analyzed and grouped to identify content that have similar tags and create a list of similar media content across a plurality of different services and media sources. For example, tags identifying action movies about superheroes may be grouped from a plurality of sources and services so that superhero action movie media content from a plurality of different sources may be identified in a given list. The media content identified for a particular attribute or composite attribute from the plurality of sources and services may be further narrowed down based on user consumption. By monitoring user viewing history of media that is actually being consumed and by identifying how many users view common items on the list of similar media content, the list of similar media content may be filtered to identify popular content for a particular attribute or a composite attribute. Media content that is determined to be popular to a given user at a particular device and other users may be recommended to the given user at the given device. For example, superhero action movies that are determined to be of interest to the given user for a teenage child's bedroom television and users with similar media tastes as the given user, may be recommended at the teenage child's bedroom television. Grouping media content tags from a plurality of sources and services according to a parameter or attribute allows for a full list of available content to be generated and then refining that list based on user consumption history and preferences allows for content recommendations to be formed from a comprehensive amount of media sources that a user will actually be interested in. Media content tags may be collected from a plurality of sources, grouped by similar attributes, and narrowed based on user consumption patterns. Upon narrowing of the list of correlated media content tags, the media content associated with the correlated media tags is identified and recommended to a user.

In some embodiments, media asset lists for a variety of menu categories corresponding to different combinations of media attributes may be generated before a system recommends such media asset lists for display at any particular user device. For example, the computing device may automatically generate new media asset lists for unique menu categories that have not already been generated. As new media content is available, new media asset lists may be generated using preexisting media assets and the newly available media assets. Metadata from the newly available content may be examined by a computing device to identify one or more common attribute shared between the newly available content and/or preexisting content. The computing device may generate new menu categories using different combinations of the identified one or more common attributes. The computing device may take into account what media content is popular amongst a plurality of viewers by examining media consumption history and media preference data for a plurality of different viewers in generating new menu categories. For example, as new episodes of fantasy television shows such as "True Blood" and "Being Human" are available, the computing device may determine that these programs are popular with several users and accordingly generate a media asset list with the category "Dark Drama Television Shows about Vampires & Werewolves." The computing device may include preexisting episodes for television shows that match such a menu category such as "Buffy the Vampire Slayer" and/or "Lost Girl." New menus comprising old and newly available content may be generated continuously, periodically, or as new content becomes available.

In some embodiments, media menus that share a strong similarity to each other may be prevented from being displayed together on a personalized media interface 300, so that the limited amount of screen real estate is devoted to a variety of menus having different offerings. Menus with media attributes that share a strong similarity and menus that contain a significantly high number of the same media assets as each other may be prevented from being displayed on media interface 300. As media menus or media asset lists are generated, media asset lists having at least one common attribute or at least one common related attribute as other media asset lists may be compared with each other. Similarity between a plurality of media asset lists may be determined if the media asset lists contain a number of media assets that is determined to be above a preset threshold number of media assets set as the benchmark to determine similarity amongst media asset lists. For example, if two lists have 50% overlap in the content they list, then the two lists may be deemed too similar. Media asset lists that are determined to be very similar to each may be grouped into clusters. The personalized media interface 300 may select which media asset list is selected for display from each cluster of similar media asset lists. For example, the personalized media interface may determine which media asset lists from the cluster contains media assets that a viewer would be most likely to view. For example, a first media asset list that contains more crime drama television shows may be selected over a second media asset list that contains more crime drama movies if the user prefers to watch television shows or if the crime broadcast television shows in the first list are scheduled to be broadcast at a time during which the user prefers to watch crime drama television shows. In some other embodiments, a user may manually select which media asset list of the cluster is selected for display at the personalized media interface 300 as the representative media asset list of each cluster of similar media asset lists. Alternatively or additionally, an administrator with access to remote servers, such as an application server 107, from which media menus may be downloaded to a user device may select which media asset lists are selected for display at personalized media interfaces of user devices in communication with the remote servers.

Media asset lists or menus may be created with a plurality of attributes to create very personalized and specific menus. Often a plurality of combinations of tones, themes, actors and genres may be used to create one specific personalized menu that is determined to be of interest to user(s) at a media device. Once menus are narrowed by choosing a representative menu to be displayed in the personalized media interface 300 from a cluster of similar menus, the personalized media interface 300 may be curated to show unique but highly specialized menus, each having a plurality of attributes but different media asset content from one another. The computing device may determine how many different personalized media asset lists to display at a particular user device by analyzing the media consumption at that device. The number of personalized media asset lists displayed at the personalized media interface 300 of each display device may differ from device to device. The computing device may determine the number of media asset lists by monitoring the variety of content that the user(s) of each display watch and by determining the minimum number of media asset lists required to accurately capture different combinations of unique media asset lists having different content from each other that span the variety of different media content that the user may be interested in viewing. For example, if the computing device determines that the user(s) only views reruns of Friends and/or Seinfeld in the living room television, then the computing device may display a small number of media asset lists (e.g., three lists) in the personalized media interface 300 upon determining that no more than three lists are needed to capture recommendations for Friends and Seinfeld episodes. The computing device may further determine that any more than three lists for Friends and Seinfeld episodes generates too much overlap in media content in the media asset lists and decided that three lists are enough to capture all that the user will be interested in watching. However, for a different media device such as the bedroom television, the computing device may determine that the user watches news programs, science fiction movies, reality television shows, comedy movies, and/or documentaries. Accordingly, the computing device may determine that a higher number of media asset lists (e.g., fifteen lists) are required to accurately capture the variety of content that the user may be interested in viewing at the bedroom television. The computing device may analyze attributes of media assets watched at a particular device (i.e., genre, theme, media series, actor, tone, subject matter, etc.) and the frequency with which media assets associated with such attributes are watched at a particular user device to determine the amount of media asset lists and which media asset lists to display at the personalized media interface of such a user device.

In some embodiments, the personalized media interface 300 displays menus in a ranked order. Menus that are determined to be of the highest interest to user(s) associated with the device on which the personalized media interface 300 is displayed, may be displayed higher on the personalized media interface 300 than menus deemed to be of lower user interest. User interest in a media asset menu may be measured as a function of media consumption histories, user media preferences, time of day, and/or user location. In order to determine which menus to display on personalized media interface 300, the narrowed set of menus may be ranked in order of amount of interest to viewer(s) of the device at which the personalized media interface 300 is displayed. Media asset lists may be assigned a composite score using the individual consumption and/or browsing history scores of each of the media asset lists' media assets. Once each media asset list is assigned such a media asset list score, media asset lists with the highest score may be selected for inclusion in the personalized media interface 300. Additional factors such as the time of day, date, and/or user location may also factored in calculating a media asset list score. Such a media asset list score may dynamically change. For example, Christmas-related programming may be assigned a higher score in December than in other months. Media asset lists containing local area programming may be assigned a higher score once the user device on which the media interface is displayed is determined to be in the region corresponding to the local area programming. Similarly, media asset lists containing programming associated with a certain part of the day may be assigned a higher score and ranking during that certain part of the day. Once media asset lists have been assigned a score, media asset lists with the highest score may be displayed on the personalized media interface 300. In some embodiments, personalized media interface 300 may have a preset upper limit on the number of media asset lists that are displayed. Accordingly, the highest ranking preset number of media asset lists may be selected for display. The media asset lists may also be arranged for display in personalized media interface 300 in descending order of media asset lists scores.

In some embodiments, media assets within a media asset list may also be arranged in an ordered fashion. In some implementations, media assets may be arranged within the media asset list in a descending order with respect to their media consumption and/or browsing history score. In other implementations, media assets may be arranged within a list based on other factors such as the number of times the media asset has been consumed by the users(s) of a given device on which the personalized media interface 300 is displayed, the local airtime of the media asset, time of day, and/or date. Media assets may be rearranged within media asset lists continuously or periodically as user consumption patterns are updated.

Different personalized menus may be displayed for the same user account at different devices and for different times of day. For example, a set top box associated with a living room television may display menus recommended for children during the day and for parents during the night based on previous media asset consumption patterns for the living room television. Different personalized menus for the same user account may also be displayed on different devices. For example, the set top box for the living room television logged in with the father's account may display family based programming menus whereas a personal tablet device logged in with the same father's account may display menus personalized for the father geared towards more adult themed content.

Once a media asset listing in a menu displayed on the personalized media interface 300 is selected, a recommendation list for additional programming related to the selected media asset may be displayed in the personalized media interface 300 as shown in FIG. 3B. In the example shown in FIG. 3B, media asset 310, Kitchen Nightmares, is selected. Accordingly, a recommendation menu 342 may be displayed with media assets determined to be similar to media asset listing 310. The recommendation menu 342 may also be a recommendation list. The recommendation menu 342 may be populated with media assets 344, 346, 348, 350, and 352, each of which may be determined to share some media attributes with selected media asset listing 310. For example, media assets 344, 346, and 348 are reality television shows about cooking starring chef and television personality, Gordon Ramsay, just like selected media asset listing 310. The media asset 350 may also related to selected media asset listing 310 since it is a reality television show starring Gordon Ramsey and media asset 352 is related media asset listing 310 since it is a reality cooking television show. As evidenced from the example scenario depicted in FIG. 3B, the recommendation menu 342 may include media assets arranged based on the degree of relatedness to selected media asset listing 310. For example, media asset listings 344, 346, and 348 may share at least three common attributes as selected media asset listing 310: genre (reality television show), theme (cooking), and actor (Gordon Ramsay) whereas media asset listings 350 and 352, which share two of those three attributes as the selected media asset listing 310. Therefore media asset listings 330 and 332 may be arranged after media asset listings 344, 346, and 348 in the recommendation menu 342.

Recommendation lists for media assets similar to a selected asset from a media menu may be based on content based attribute tags found in the metadata or tags associated with a particular media asset. For example, the recommendation may be made for a media content that has either one or more of genre, tones, theme, actor, director, parental guidance rating etc. as the selected media asset listing. Recommendation lists for media assets may also be based on usage by collecting user consumption history at a particular device and identifying what other users who have similar preferences and consumption histories as the user like. In some embodiments, such usage based history may be given less weight than metadata based content attribute based recommendation. Recommendation lists for media assets may also be made if an editor, such as the media provider, has explicitly provided a set of related assets for the media asset that the user has selected. In some embodiments, such editorial recommendations may be given the most weight since the recommendation has been made by a person or by the media provider.

Figure 4:
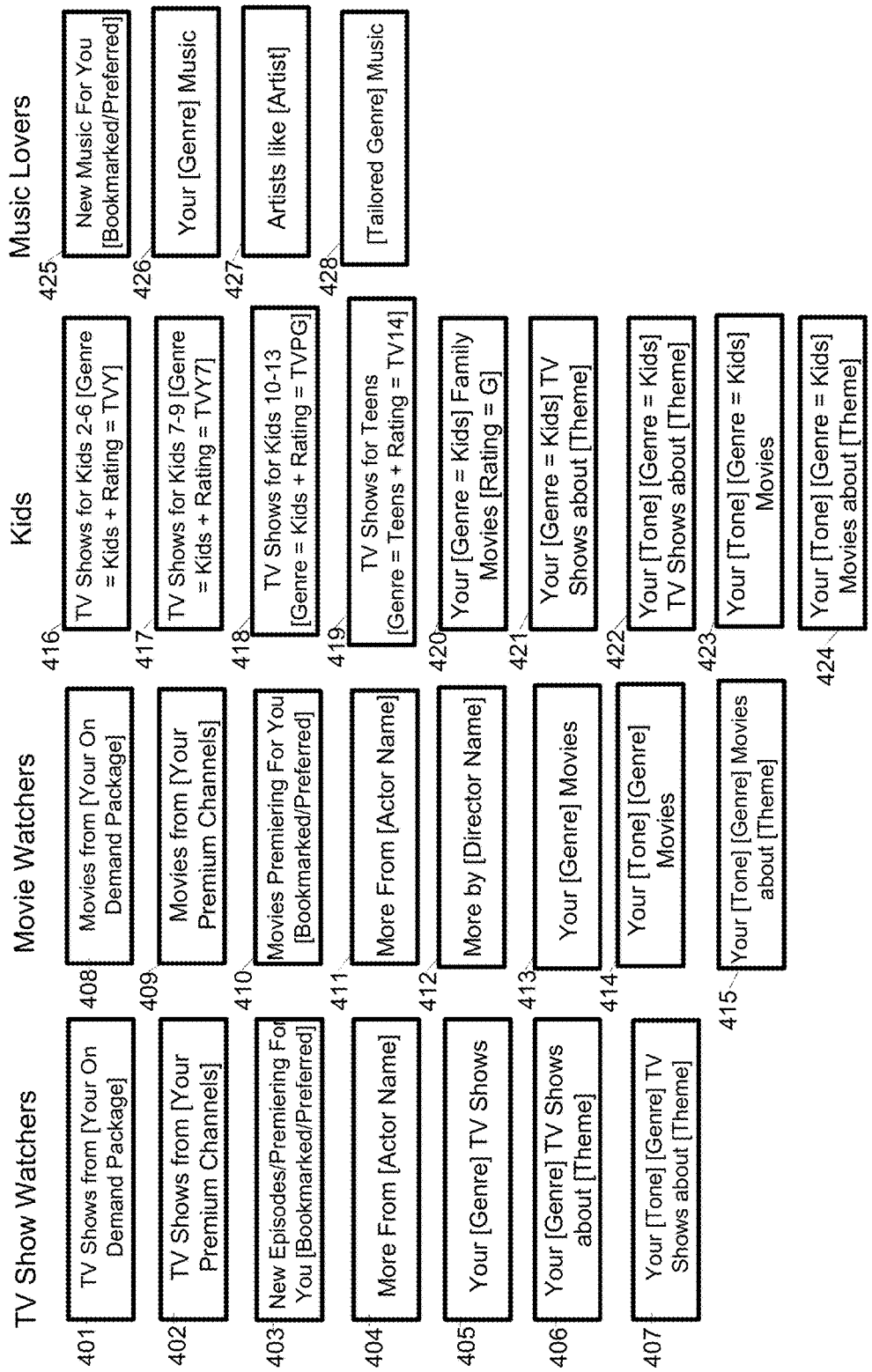
FIG. 4 illustrates an exemplary data structure for populating a personalized media interface.

FIG. 4 illustrates different combinations of attributes used to generate predetermined search queries based on which personalized menus (for example, menus 304, 306, and 308 of FIG. 3A) are created. FIG. 4 shows different configurations of attribute combinations that may be used to generate different personalized menus, which may be categorized by audience type (i.e., TV show watchers, movie watchers, kids, and music lovers). Each attribute combination category may be populated with different genres, tones, actors, and/or premium channels etc. to create several different personalized menus. Such menus may be created based on the attributes that are identified to be of most interest to users(s) of a particular device displaying personalized media interface 300 of FIG. 3A, and may be generated by the system herein before the user actually requests to see any list of recommendations. Such attributes may be identified based on consumption patterns, browsing histories, and several other factors used in making recommendations as discussed above with relation to FIG. 3A. Once the appropriate menu attribute combination is selected, menus may be populated with media assets that contain tags that match all of the requirements of the menu attribute combination. Furthermore, the selection of media assets that match such attribute combinations may be narrowed based on a user interest in the media asset as determined from the user consumption score associated with each media asset. This process allows for generation of menus that are specific and personalized based on the user(s)'s tastes.

Different menu attribute combinations may be selected for different types of users in order to generate personalized menus. For example, if the user is detected to prefer television shows, more menus would be generated using menu attribute combination templates 402, 404, 406, 408, 410, 412, and 414 than any other menu attribute combination category. Different menu categories can be generated by using menu attribute combination templates as shown in FIG. 4 along with specific media attributes (i.e., genre, tone, theme, rating, actor, artist, channel name, preferred show names etc.). For example, attribute combination template 414 may be used to create menus populated with television shows from a specific genre and tone determined to be of interest to the user about a particular theme also determined to be of interest to the user. The computing device may identify which genres, tones, and/or themes the user is interested in the most based on media consumption history at a given device. Upon performing such identification, the computing device may create different combinations of menu categories using menu attribute combination template 414 and the identified genres, tones, and/or themes identified to create different media asset lists. As shown in FIG. 4, the menu attribute combination templates 401-407 may be used to generate menu categories for television shows. The menu attribute combination templates 408-415 may be used to generate menu categories for movies. The menu attribute combination templates 416-424 may be used to generate menu categories for children's programming. The menu attribute combination templates 425-428 may be used to generate menu categories for music. Several other combinations of attributes besides those shown in FIG. 4 may also be used to generate menus for display in a personalized media interface.

Figure 5A:
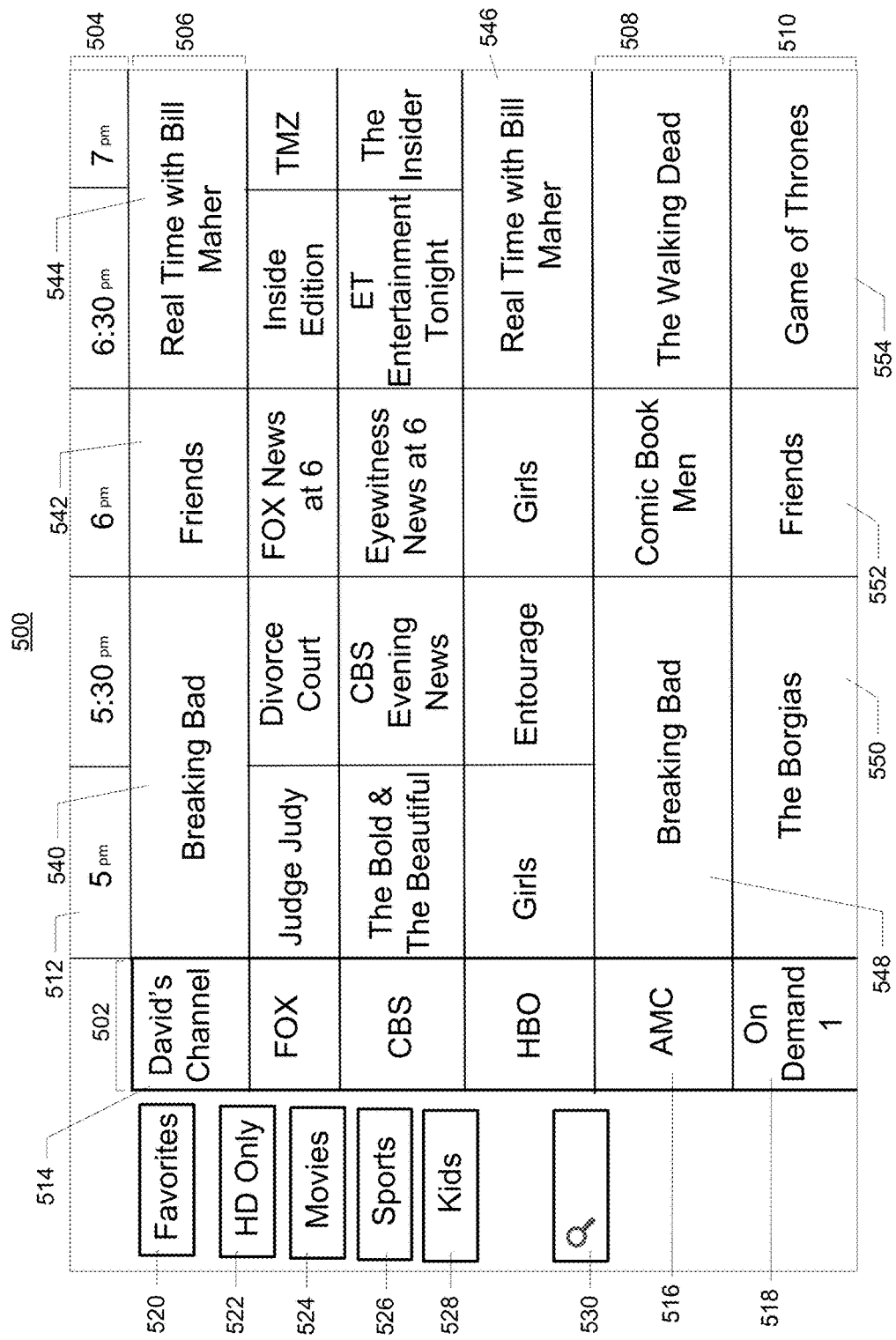
Figure 5B:
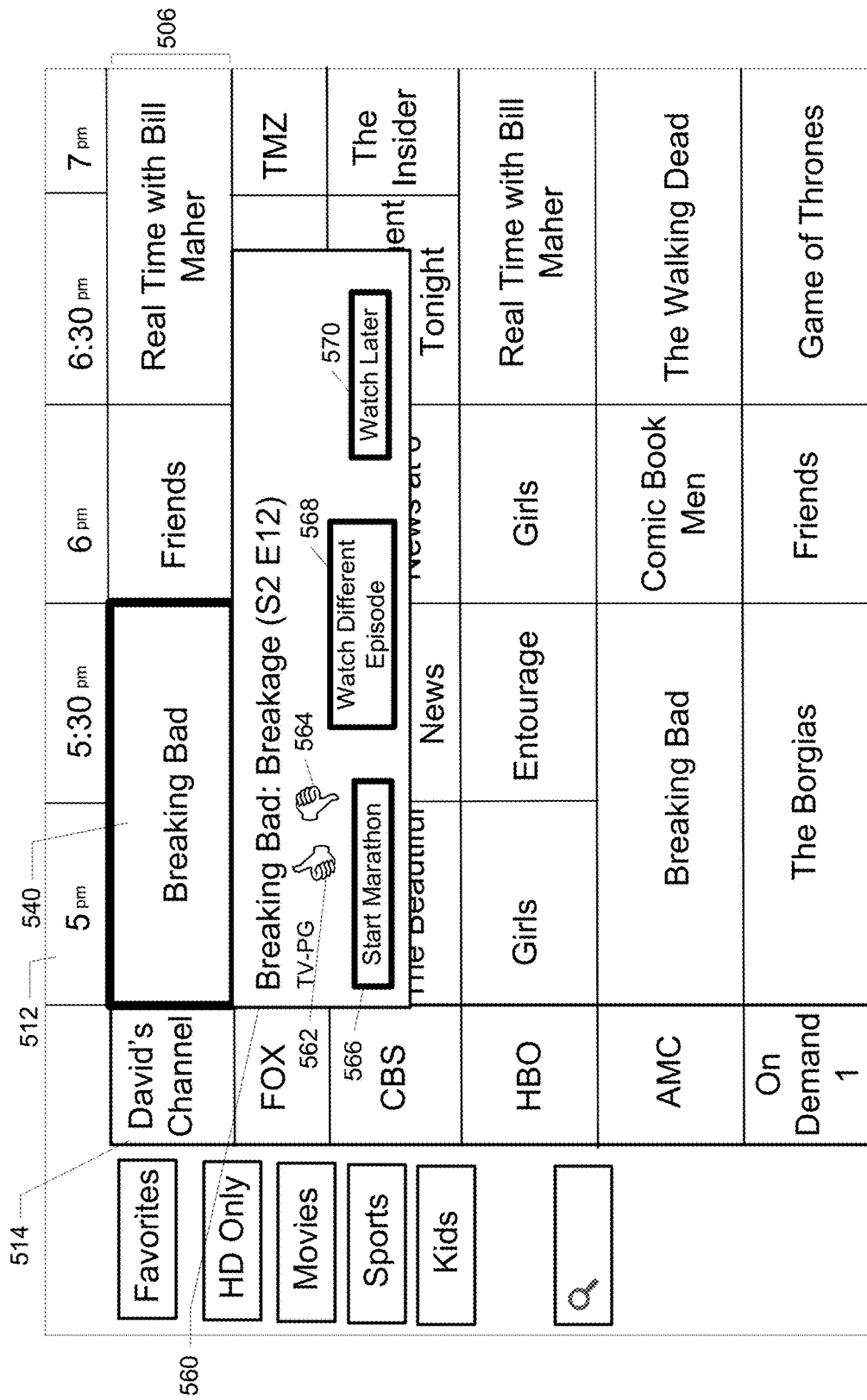

FIG. 5A illustrates a personalized media schedule screen 500 that displays media asset listings to the user on a media interface. Such a personalized media schedule screen can be displayed on any type of user display device on which a personalized media interface is displayed. The personalized media schedule screen 500 may display media asset listings in a grid-like display format as shown in FIGS. 5A-C by arranging the media assets listings by media provider and by a time during which the media asset is scheduled to be multicast (a grid is shown as an example, but any desired format of displaying a schedule may be used). Media asset listings may be arranged by time at which the media asset corresponding to the media asset listings are scheduled to be displayed and by channels on which the media asset listing may be provided. In the example of FIG. 5A, each row of the media schedule screen 500 may comprise a channel. Channels 506, row 508, and row 510 may be identified by channel identifiers 514, 516, 518. For multicast media channels such as channel 508, the channel identifiers may identify the multicast media provider. For virtual channels such as channel 506, the channel identifiers may identify the criteria based on which the media asset listings in the virtual channel are displayed. For example, the channel identifier 514 may identify that the media asset listings in channel 506 are listings for media assets recommended for the user, David. The column 502 of channel identifiers may identify all of the channels including on demand channel such as channel 510. The media schedule screen 500 may include row 504 of time labels such as time label 512 to indicate when a media asset corresponding to the media asset listing in the grid-like media schedule is scheduled to be made available to the user.

Media asset listings for multicast media assets may be displayed in different channels from on-demand media assets. Media asset listings such as media asset listing 548 for multicast media assets may be displayed in rows dedicated to the multicast media source such as row 508 for the American Movie Classics (AMC) television channel, identified by channel identifier 516. Media asset listings such as media asset listings 550, 552, 554 for on-demand media assets may be displayed in rows dedicated to on-demand channels such as row 510 for an on-demand channel, identified by channel identifier 518. Since on-demand media asset listings are available to the user at any time unlike multicast media asset listings, the computing device may arrange the display of the on-demand media asset listings in the grid format based on user consumption patterns. For example, upon determining that a user likes to watch sitcoms at 6 PM from the user's consumption history, the computing device may include a media asset listing 552 for a comedy sitcom, such as "Friends," at 6 PM in on-demand media asset listing row 510.

The computing device may also generate the display of personalized virtual channels in the media schedule screen 500. A personalized virtual channel is illustrated as channel 506 and identified by channel identifier 514 as David's (the user's) channel. Personalized virtual channel 506 may include media asset listings 540, 542, and 544 which are sourced from available sources such as multicast media channels and on-demand channels. For example, media asset listings 540, 542, and 544 correspond to media asset listings 548, 552, and 546, respectively, which are originally made available from multicast media channels and video on-demand channels.

The media schedule screen 500 may include filtering buttons 520, 522, 524, 526, and 528 that, when activated, only display or display in a highlighted manner, the media asset listings corresponding to the filter criteria of the filtering button activated. For example, filter button 522 for high definition content, when activated, may activate a highlighted display of media asset listings for media assets available in high definition format. Media asset listings for standard definition media content may be displayed in a faded format or may be removed from media schedule screen 500 upon activation of filter button 522. The media schedule screen 500 may include search panel 530, in which the user may enter text characters to search for media content.

The computing device may personalize the media schedule screen 500 to rank the user's favorite media sources or channels as identified from the user's preferences or media consumption history. The computing device may generate a display of the media schedule screen 500 such that rows corresponding to user favorite media channels may be displayed higher in the media schedule screen 500 than rows for other channels. Similarly, the computing device may display personalized virtual channel rows such as channel 506 at the top of the media schedule screen 500. The personalized virtual channel row 506 may be populated with media asset listings identified to be of interest to the user from various different multicast media channels, video on-demand sources, the user's own library of DVR recordings, or any other desired source of content. In some embodiments, media asset listings displayed in the personalized virtual channel row 506 may be displayed by the computing device at the same time slot at which they were originally supposed to be made available at the channel that they are sourced from. For example, the 5 pm scheduled airing of "Breaking Bad" may be listed at the 5 pm slot in the user's virtual channel. In another embodiment, the computing device may display the virtual channel contents in a customized order, in which scheduled content is listed at a different time from its originally scheduled time. The computing device may rearrange scheduled content to fit the user's own desired schedule (e.g., the preference for viewing comedy at 5 pm). To support this rearranging, the computing device may record a media asset listing for multicast media content in a digital video recorder and may display the media asset listing at a later time slot if such multicast media content has been determined to be included in the personalized virtual channel.

In order to include media content listings in the personalized virtual channel, the computing device may determine which media content the user would be most interested in viewing for each time slot. Such a determination may be made by monitoring user consumption habits. If the user(s) at a particular device watch sitcoms at 6 PM, a sitcom that the user is most likely to be interested in is included in the personalized virtual channel 506 at that time.

In some embodiments, media content may be selected for inclusion into a virtual channel based on content freshness. For example, even if the user likes to watch sitcoms at 6 PM and Friends is the user's favorite sitcom, the system may include a different sitcom that the user also likes if the user has watched several episodes of Friends within a recent time frame, because the other sitcom that the user has not recently watched is considered fresher. The system determines the recent time frame and the tradeoff between displaying another episode of the user's favorite sitcom and another media content that the user has not viewed recently is made by monitoring the user's consumption history and by understanding the viewing habits and patterns of the user. If the computing device determines that there are a plurality of multicast media assets that the user would be most interested in but which are scheduled to be multicast at the same time, the computing device may generate a media asset listing for the first media asset for display in the virtual channel and may instruct recording of the other multicast media assets in a DVR for inclusion in the personalized virtual channel at a later time slot. The user may be allowed to select which one of these multiple multicast media assets is to be selected for inclusion in the virtual channel at the original time of multicast and which media assets are to be recorded in the DVR for inclusion at a later time slot in the virtual channel. If two media content assets are multicast at the same time and based on user consumption habits it is determined that the user typically watches one media asset after the other, the computing device may record the media asset not included at the virtual channel during its original multicast time and include the recorded media asset in the next available virtual channel time slot. The system may also prompt the user to provide one or more criteria weights that may be used to determine which programs take priority in case of conflict (e.g., a user may indicate a "strong" liking of one sitcom series, and a "medium" liking of another; or the user may indicate that a "fresh" program is only fresh if the user has not watched an episode in 2 weeks).

Media content is determined for inclusion at a particular time slot from several different media sources. Once the media content that the user is determined to be the most interested in has been included in the personalized virtual channel, empty virtual channel time slots in which no media content has been included from the first pass of including media content determined to be of the highest level of interest to the user. Once such empty time slots are identified, on-demand media content determined to be of interest to the user may be selected from video on-demand channels to be scheduled at the empty time slots. Prerecorded media content determined to be of interest to the user from the user's DVR or local media storage may be selected for inclusion in the personalized virtual channel in the empty time slot. Content listings for these media content items determined to be of interest to the user may be generated at these empty time slots.

In some embodiments, media content items determined to be of interest to the user may be scheduled in the empty time slots based on a consumption history of the user. For example, the media asset listing 540 for a "Breaking Bad" episode may be scheduled at the 5 PM timeslot of the channel 506 by determining that, of all the media content available for scheduling in the 5 PM timeslot, the "Breaking Bad" episode would be the media content item that the user would be most interested in watching during the 5 PM timeslot. Such a determination may be made by identifying that the user typically watches a "Breaking Bad" episode at this time or watches media content with a similar genre, actor, theme, and/or rating. Such a determination is made by examining the consumption history of the user.

In some embodiments, the media content items that are scheduled in the empty time slots of the media schedule screen 500 may be identified by examining device specific consumption history of a user. For example, the user may have a user account that is associated with multiple user devices on which the user consumes media content. The media schedule screens displayed on these different user devices may recommend different media content items. For example, the media content items identified to populate the empty timeslots may be selected based on monitoring the consumption history of the user at that given user device. If it is determined that the user watches family oriented media content on the living room television, then the media schedule screen 500 associated with the living room television may have family friendly media items scheduled in the empty timeslots of different channels. However, if it is determined that the user watches adult content on the master bedroom television, then the media schedule screen 500 associated with the master bedroom television may have adult themed media items scheduled in the empty timeslots of different channels.

In some embodiments, the media content items that are scheduled in the empty time slots of the media schedule screen 500 may be prior episodes of a media content item listed in the media schedule screen 500. A user input may be received to view successive episodes of a recurring series of episodes corresponding to a content item listed in the consumption schedule such as the media asset listing 540 for a "Breaking Bad" episode. One or more unwatched episodes of the "Breaking Bad" series which precede the episode identified by the media asset listing 540 may be identified. These unwatched episodes may be scheduled for consumption in the media schedule in timeslots preceding the timeslot of media asset listing 540.

In some embodiments, the media content items that are scheduled in the empty time slots of the media schedule screen 500 may be identified by performing a media search. A plurality of characters of an input search string for the media search may be received. A relative weighting may be determined between media providers and media assets for the media search based on a determination of whether a character count of the plurality of characters exceeds a predetermined number. The media search may be conducted such that the media providers and media assets are weighted based on the relative weighting of the media providers with respect to the media assets. In response to a determination that a number of characters in the input search string is less than a predetermined number of characters, the search results for the media providers may be ordered for display before search results for the media assets. Such media content search is discussed in greater detail below with respect to FIGS. 7A and 7B.

FIG. 5B illustrates that a media asset listing (the 5 pm "Breaking Bad" episode) is selected in the personalized virtual channel row 506. Once media asset listing 540 is selected, media asset listing 540 is highlighted and information panel 560 with options and information related to the selected media asset listing 540 may be displayed as an overlay over other media asset listings displayed in media schedule screen 500. Information panel 560 may include the name of the episode and/or additional information such as rating, runtime, parental guidance rating etc. for the media asset associated with the selected media asset listing. The information panel 560 may also include feedback buttons 562 and 564 for the user to input his feedback for whether he likes the recommended media asset corresponded to the selected media asset listing. If the user selects the thumbs up feedback button 562, the selected media asset may be marked as a user preferred show and the consumption score of the media asset associated with the selected media asset listing may increase. If the user selects the thumbs down feedback button 564, the selected media asset, the consumption score of the media asset associated with the selected media asset listing may decrease. In an embodiment, the media asset listing 540 may be replaced with a different media asset listing for another recommended media asset at the time slot occupied by media asset listing 540 if the user selects the thumbs down button 564. In some embodiments, once thumbs down feedback button 564 is selected, a list of options may be displayed to the user on screen 500 prompting the user for further options on how to proceed. Some of these options may be to remove the episode from the virtual channel 506, to remove the entire series from virtual channel 506, or to never display media asset listings for media assets similar to the media asset corresponding to media asset listing 540.

The button 566 in information panel 560 allows the user the option to begin watching episodes of the series corresponding to media asset listing 540 in succession in virtual channel 506. For example, the user may wish to have a marathon session of watching episodes of a particular series, sometimes known as "binge watching." Selection of button 566 removes media asset listings from the next few available time slots in channel 506 and replaces them with successive episodes of the media series that the user wishes to watch in a marathon. In an embodiment, episodes starting after the episode corresponding to media asset listing 540 are displayed in succession in virtual channel 560. In another embodiment, media asset listing 540 is replaced and all episodes starting from the first episode are arranged in virtual channel 506. In another embodiment, in response to activating button 566, an option may be provided confirming to schedule consumption of the media series episodes preceding episode of media asset listing 540 that the user has not yet consumed. Such an option may further confirm that these unwatched episodes will be scheduled for consumption at a time prior to the scheduled 5 PM consumption timeslot of media asset listing 540. These media asset listings for the unwatched series episodes may be listed prior to and adjacent to the 5 PM scheduled consumption timeslot of media asset listing 540. For example if there is only one unwatched media series episode for "Breaking Bad" preceding the episode identified by media asset listing 540, then the media asset listing for this unwatched episode may be arranged at the 4 PM timeslot immediately prior and adjacent to the 5 PM timeslot of media asset listing 540. If there are multiple unwatched media series episodes for "Breaking Bad" preceding the episode identified by media asset listing 540, then the media asset listings for these unwatched episodes may be arranged back to back in immediately consecutive timeslots such that the media asset listing for the last episode of the unwatched episodes is scheduled at the timeslot immediately prior and adjacent to the 5 PM timeslot of media asset listing 540.

The button 568 in information panel 560 allows the user the option to watch a different episode of the same series as the media asset corresponding to the selected media asset listing 540. The computing device may generate the display of an overlay over media schedule screen 500 that lists different episodes of the same series as media asset listing 540 upon selection of button 568 if the media asset for media asset listing 540 is determined to be part of a series and that additional episodes of the same series are available for display at the time slot corresponding to the one occupied by media asset listing 540.

The button 570 in information panel 560 allows the user the option to move the media asset listing 540 to a later time slot in virtual channel 506. The user may be allowed to specify the new time slot at which media asset listing 540 is to be displayed if button 570 is selected. Once the media asset listing is moved to a later time slot, media asset listing 540 may be replaced with a different media asset listing for another recommended media asset at the time slot occupied by media asset listing 540. Alternatively or additionally, the user may be allowed to simply drag media asset listing 540 and drop it at a different time slot in virtual channel row 506. If the time slot at which the media asset listing 540 is dropped is occupied by a media asset listing, that media asset listing may be moved to the time slot previously occupied by media asset listing 540 or that media asset listing may be moved to the next available time slot. Accordingly, all media asset listings may be pushed back to a later time slot if the user drags and drops media asset listings to previously occupied time slots. If a multicast media asset scheduled for a predefined time slot in any channel row runs overtime (e.g., the football game runs 15 minutes beyond its scheduled end time), the media asset listings in the user's virtual channel that follow the overtime media asset may be pushed back in the virtual channel's schedule and, if needed, recorded by the DVR.

In some embodiments, the media asset listing 540 may be moved to a time slot that occurs after the multicast time of its corresponding media asset. In response to determining that the new timeslot to which media asset listing 540 is moved to occurs at a time after the multicast time of the corresponding media asset, the corresponding media asset may be recorded for future consumption at the new timeslot. If the corresponding media asset is selected by the user for viewing during its new timeslot, the recording may be played back.

In some embodiments, activation of buttons 566 and 568 to start a marathon and to watch a different episode instead of watching the media asset identified by the currently selected media asset listing 540 may cause one or more currently scheduled media asset listings to be moved to different timeslots in the media schedule. The new timeslot to which the currently selected media asset listing 540 is to be moved to may be determined by determining the total amount of time needed to consume unwatched series episodes if button 566 is selected or the total amount of time required to watch the different episode if button 568 is selected. To determine the new timeslot, the minimum amount of time that media asset listing 540 should be delayed is determined based on the total amount of time required to watch the episodes that the user has requested to watch instead of media asset listing 540.

FIG. 5C illustrates the media schedule screen 500 once button 566 is selected to begin a marathon of the series corresponding to media asset listing 540. The media asset listings 542 and 544 previously displayed in virtual channel row 506 in time slots after media asset listing 540 may be replaced with media asset listings 572 and 574 for episodes of Breaking Bad, the series corresponding to media asset listing 540. If it is determined that certain episodes of the series have been watched previously by the user or recently watched by the user, media schedule screen 500 may display a notification to the user for media asset listings corresponding to such episodes so that user can exercise an option to replace media asset listings for these episodes in virtual channel 506 with media asset listings for episodes of the series that he has not yet watched in order to catch up the user on the series as quickly as possible. In an embodiment, if a future scheduled media asset listing is selected by the user for binge watching, the computing device may determine if there are any series episodes for that series that the user has not watched. If there are unwatched episodes for that series, the computing device may generate listings for these episodes in the virtual channel in time slots before the selected media asset listing. If there are too many unwatched episodes, which cannot possibly all be watched in succession before the media asset for the future selected media asset listing is to be multicast, the computing device may instruct the DVR to record the media asset for the future scheduled listing and replace the selected media asset listing and all other media asset listings from the current time forward with media asset listings for the unwatched episodes. The computing device may list the recorded media asset in the virtual channel once all the unwatched episodes of the series prior to the recorded episode have been listed in the virtual channel.

Figure 6:
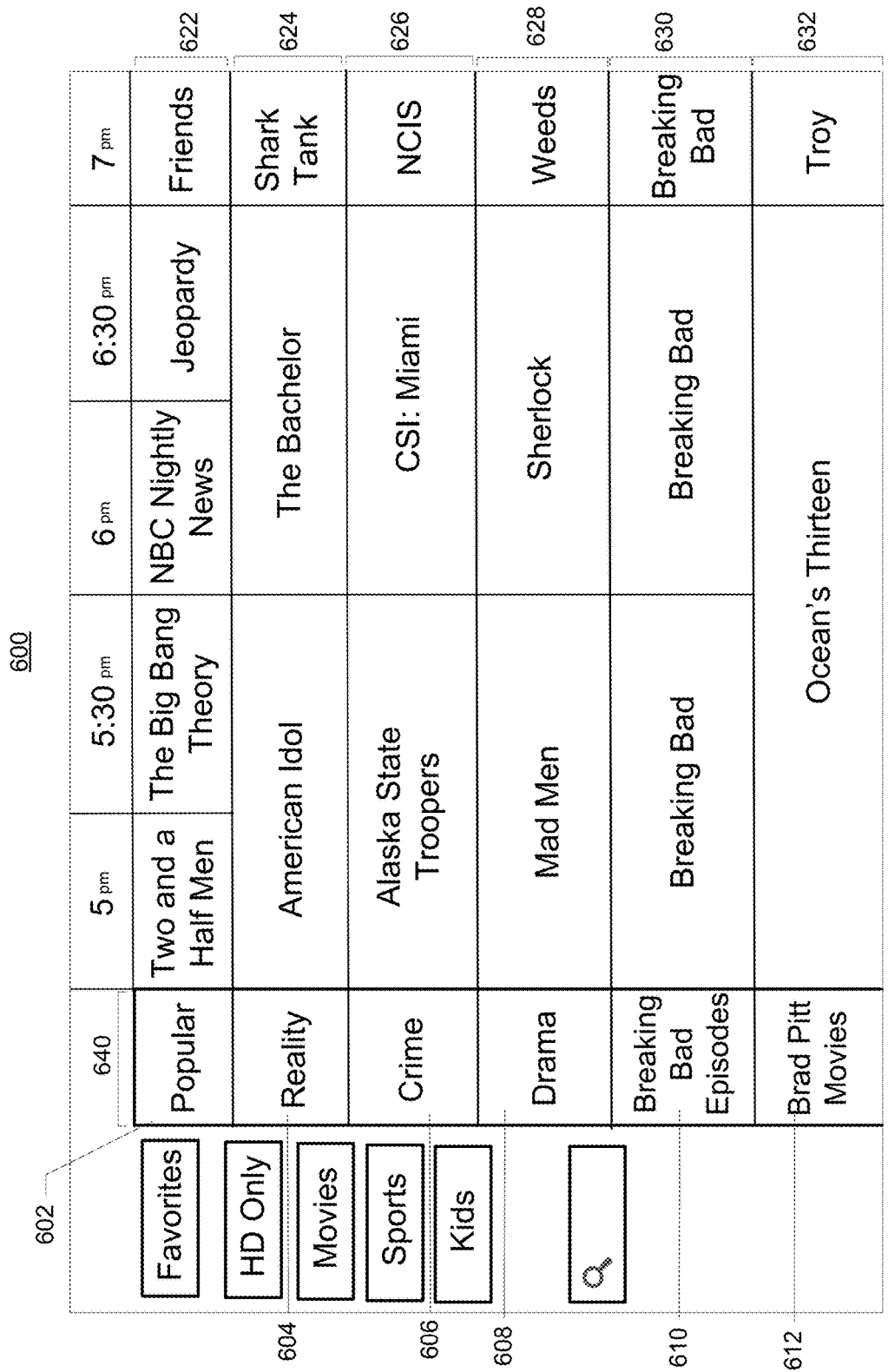

FIG. 6 illustrates a media schedule screen 600 in which all rows of the media schedule correspond to virtual channels. The features of the media schedule screen 600 may be similar to media schedule screen 500 of FIGS. 5A-C except that media schedule screen 600 includes only personalized virtual channels instead of a mix of multicast channels and personalized virtual channels as shown in FIGS. 5A-C. Virtual channels 622, 624, 626, 628, 630, and 632 correspond to virtual channel identifiers 602, 604, 606, 608, 610, and 612, respectively, which describe the media attribute shared by the media assets listed in each virtual channel. The computing device may generate virtual channels for genre based channels such as channels 624, 626, and 628. Each of these channels may be selected for inclusion in media schedule screen 600 by identifying genres that the user has the most interest in. The computing device may arrange the virtual channels for display in media schedule screen 600 according to the level of interest that the user has for the media asset list corresponding to the virtual channel. The computing device may retrieve the content for these virtual channels from media asset lists of media menus as shown in FIGS. 3A-B from predetermined search queries of potential interest to the user that are generated using any combination of media asset metadata attributes. Channel identifiers displayed in column 640 for such virtual channels may describe the attribute or attribute combination as discussed with relation to FIG. 4 that are used to create media asset lists. The computing device may also create virtual channels for episodes of a particular series of interest to a user, such as channel 630 for episodes of the series Breaking Bad. The computing device may also create virtual channels for media content having a particular actor that a user likes, such as channel 632 for movies starring Brad Pitt.

A given period's programming in the virtual channels may be filled based on programs meeting the virtual channel's criteria, the scheduled multicast or broadcast time for programs that are airing that evening (e.g., tonight's episode of "The Walking Dead"), the user's time and content viewing preferences (e.g., user prefers comedies before 8 pm), and/or any other desired criteria for filling the schedule. Each media asset listing in media schedule screen 600 may also include buttons to allow the user to input a rating for the media content associated with the media asset listing, a button to initiate a series marathon for the selected asset, a button to schedule the media asset listing for a later time, and/or a button to replace the media asset listing with a media asset listing for a different media asset.

Figure 7A:
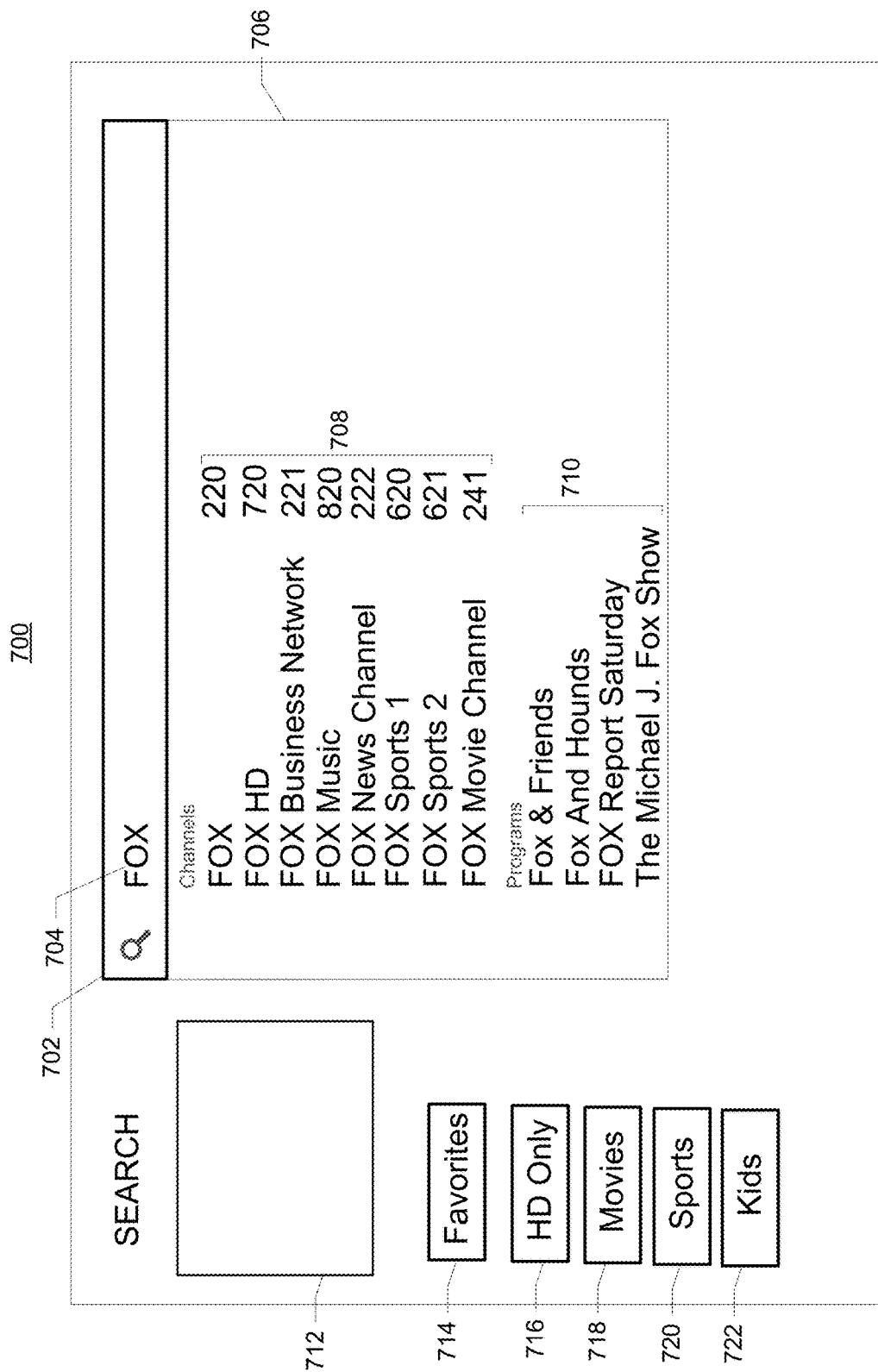
FIG. 7A-B illustrate exemplary screen displays of media searching features described herein.
Figure 7B:
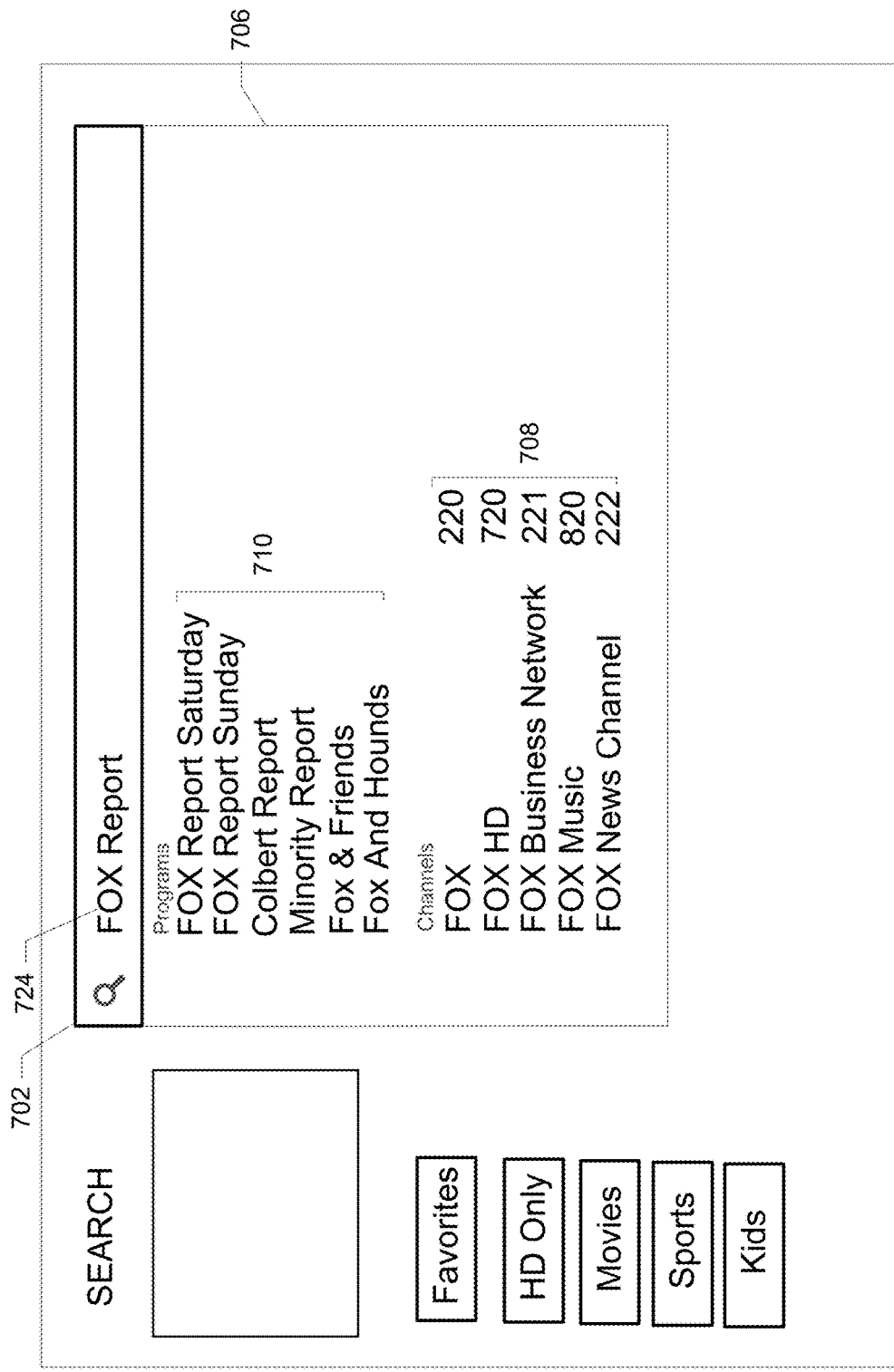

FIGS. 7A-B illustrate example screenshots for a text search feature that may be implemented, for example, with the program guide discussed above. FIG. 7A illustrates a media search functionality of a personalized media interface. Media search screen 700 may be displayed on the personalized media interface when a user enters a search query 702 into any search query area 704 of the media interface. In another embodiment, media search screen 700 may be displayed on the personalized media interface in response to determining that a media search is to be conducted to identify one or media content items to fill one or more empty timeslots of the media interface. In another embodiment, search screen 700 may be displayed on the personalized media interface when a user simply begins typing in characters using an input device, such as typing in letters using a remote control or via an onscreen text input interface. As the user enters letters into search query area 704, a search result area 706 may be populated with search results 708 for media providers and search results 710 for media assets that satisfy the search criteria entered thus far.

For the first few letters entered by the user (e.g. a predetermined threshold of the first 3 or 4 letters), the media search results 708 for media providers may be assigned a higher weighting in the search results displayed in search result area 706 than other media search results such as search results 710 for media assets displayed in area 706. In an implementation, a preset threshold for placing higher weighting to media provider search results may be set to four characters with the assumption that if a user is searching for more than four characters, then he is most probably not searching for a media provider since media providers may typically have names or identifiers less than or equal to four characters. Accordingly, search results 708 for media providers that match the user's text search criteria are displayed higher than search results 710 for media assets that match the user's text search criteria. For example, if the user typed in "Fox," then television stations that have "Fox" in their name may be displayed before video programs that have "Fox" in their name. In this way, the search system may assume that the user is more likely to be searching for the television station than the particular program. As long as the number of characters in search query 702 is less than or equal to the predetermined threshold number of characters, search results 708 for media providers are given a higher display weighting than any other search results. Search results 708 for media providers may be arranged alphabetically or according to the proximity of match to search query 702.

Although in the example shown in FIG. 7A, all search results 708 for media providers are displayed above search results 710 for media assets, this may not be the case for all text searches. The computing device may simply assign a higher display weight to media provider search results than to media asset search results but the degree of match to the entered search query 702 may also affect the weighting of the results. The higher display weight assigned to the media provider search results may not be set so high that a media provider search result that poorly matches the entered search query 702 is displayed higher in search results than a media asset search result that better matches the entered search query 702. Therefore in many different examples, not depicted in FIG. 7A, some media provider search results that match search query 702 well may be displayed above search results for media assets and some search results that do not match the entered search query 702 may be displayed below media asset search results that better match search query 702.

The search may be iteratively performed as additional characters are entered into search query 702. As each additional character is entered into search query 702, a check is performed to determine whether the number of characters in the search query 702 has exceeded the preset threshold of characters. Once the number of characters in search query 702 exceeds the preset threshold, the display weighting assigned to search results 708 for media providers relative to other search results is decreased. With the entry of each additional character in search query 702 that exceeds the preset threshold number of characters, the display weighting of search results 708 is iteratively decreased a certain amount relative to the display weighting of search results 710 for media assets matching the search query 702.

Media search screen 700 may include a preview window 712 displaying a preview of the currently tuned media asset. Media search screen 700 may also include search filters 714, 716, 718, 720, and 722. Such search filters, when activated, limit the search results according to the attributes specified in the filter. For example, if search filter 716 for high definition content is activated, the computing device may filter search results 710 for media providers to only display search results for high definition channels and search results 708 for media assets are filtered to only display search results for high definition media assets. If search filter 718 for movies is activated, the computing device may filter search results 718 for media providers to only display search results 710 for movie channels or channels displaying movies at the time the search is conducted and may filter search results 708 for media assets to only display search results for media assets that are movies.

Search results 708 for media providers may be displayed even if an alias for the media provider is entered in search query 702. For example if the user enters FSN, an acronym for Fox Sports Network, search results for Fox Sports 1 and Fox Sports 2, two different Fox Sports media providers, are displayed in search result area 706. The computing device may compare search queries to the title of media content, to the names of media providers, and/or to metadata associated with media channels and media content for aliases. Accordingly, the personalized media interface is able to understand the user's search query intelligently and is able to display the appropriate search results that the user will be most interested in and is interested in searching for.

Once the user has entered a search query with more than the preset threshold number of characters, the search results for media providers may be displayed lower in the search result area than the search results for media assets, as shown in FIG. 7B. For example, once the user has entered additional characters in search area 702 from the initial search query 704 for "FOX" so that search query 724 is for "FOX Report," a search may be executed for "FOX Report." The computing device may determine that the number of characters in the search query "FOX Report" exceeds a predetermined threshold of four characters and accordingly reduces the display weighting for search results 708 for media providers relative to search results 710 for the media assets matching search query 724. Search results 710 for media content may be arranged alphabetically or according to the proximity of match to search query 724 as illustrated in the example of FIG. 7B.

The search results may be selected and sorted according to a variety of factors in addition to the degree of match with the user input search query. Search results for new episodes, first run media assets, and other media content that the user has never before viewed may be displayed above search results in search result area 706 for reruns and media content previously viewed by the user. Search results may be sorted by the time of multicast of the media asset. For example, search results may sorted by the computing device such that search results for media content that is being multicast the soonest is assigned more display weight and is accordingly displayed other search results for media content that are being multicast later.

Search results may also be sorted by the time the multicast is scheduled to end. In an embodiment, if a media asset that matches the search query has almost finished the entirety of its multicast at the time the search is executed, the computing device may reduce display weighting for the search result for that soon-to-end multicast media asset relative to other media search results that are not almost over. For example, if the user searches for "Op" and the Oprah show that is currently being multicast only has two minutes left until the program has finished airing, search results for Oprah may receive decreased weighting over other shows matching such the search query that are not almost over, such as "Open House NYC" and "The French Open." Such rules may be product driven in that the rules for how to sort search results may have be conditional on the type of media content or media source. For example, the rule for decreasing display weighting for search results for soon-to-end media assets may be suspended only for sports genre media assets since viewers like to watch the end of sports programming but not movies or television shows. Accordingly, the system may store a set of rules for displaying and ranking search results for each product type. Alternatively or additionally, the system may store a set of exceptions to search result display rules for certain products.

In some embodiments, the user's previous consumption habits may be used to adjust how the search results should be sorted. For example, the time of day that a search is executed and the device on which the search is executed may affect the ordering of search results in the search display area 706. By monitoring consumption history of the user(s) at a given device, consumption patterns are identified for specific times of day at each device and search results are tailored to emphasize search results that match the type of media content that is typically consumed at the given device at the time of day at which the search is executed. For example, user media consumption history of the living room television indicates that children watch cartoons on the living room during the daytime and that the mother watches Oprah at 4 PM frequently. Accordingly, typing "Op" might result in search results for a cartoon during the daytime on the living room television. However, if the search is conducted a few minutes before the start of the 4 PM Oprah show, such as at 3:30 PM, search results in search results area 706 may be reordered to emphasize the display of search result for the Oprah television show above the cartoons.

In some embodiments, the location of the user device may also affect the manner in which search results are displayed. The computing device may emphasize search results for local media providers multicasting content for the region in which a device is located and may also emphasize search results for the local media content from such local media providers. For example, search results displayed on a personalized media interface of the same tablet device may differ when the user moves from one city to another. When the user is traveling, the tablet's location is identified by the GPS device located within the tablet and the location is transmitted to either a headend server or to the processor of the tablet, which then accordingly orders search results based on the new location of the user tablet device.

Media search results may also be ranked based on the metadata attributes of the media assets and media providers. For example, search results for media content or media providers associated with a genre, tone, theme, or actors that the user(s) have an interest in are assigned higher weight than other search results. For example, if the user searches for "Game" and the user prefers to watch fantasy television shows over sports, the computing device may display search results for "The Game of Thrones" above other search results such as "College GameDay." In some embodiments, the user may be able to specify and adjust the parameters used to rank search results and how much weight to assign to search results for such parameters. For example, the user may be able to specify his preference for media related to specific times of day, media type, and freshness of content using the personalized media interface.

FIGS. 8A-E illustrate an example process whose steps may be performed by the various components in the systems shown in FIGS. 1 and 2 or any other computing device. The process may be implemented in a network environment having devices such as an application server 107, a user's consumption or access device (e.g., display device 112, gateway interface device 111, personal computer 114, wireless device 116, etc.), or any other desired computing device.

In step 801, a computing device such as an application server 107 may monitor media consumption of a plurality of users. Media consumption of users is performed by monitoring which media content users watch on particular media devices, by monitoring the time of day at which users watch certain types of content, by monitoring the frequency of content users tend to watch certain types of content, by monitoring what types of content users browse and search for, and by taking note of other media analytics metrics. Monitored user consumption data for each user may be logged at the headend or at the user's local device and associated with the user's profile. Media consumption histories of users may be used to calculate how popular a media asset and a type of media asset is with a particular of user, a subset of users, and all users, as media consumption scores. Such media consumption scores may be associated with a user profile and with their respective media assets. Media consumption monitoring may be continuously performed and media consumption scores may be continuously updated accordingly.

By monitoring the media consumption of a plurality of users, in step 802, similar users may be identified. Users are found to be similar if they have similar media consumption patterns and preferences. If two or more users have similar favorite media asset types and similar favorite media assets and media asset series, then these users may be determined to be similar to one another. Users may be further determined to be similar to one another if they are geographically located in the same area and have the same media consumption patterns and preferences. Users may be further determined to be similar to one another if they consume similar media content on similar devices at the same time periods. For example, if two different users both watch morning television news shows in their living room televisions and watch Oprah in the afternoon on their tablets, they may be determined to have similar tastes. Identifying similar users is useful for generating personalized media recommendations to the user. Media content of interest to a user identified to have similar preferences as a given user may be recommended to the given user.

In step 803, the computing device may monitor whether a request to generate a personalized menu has been received. Such a request to generate personalized menus may be automatically initiated by the personalized media interface before the user has actually requested to see any menu listings. Such a request is typically initiated by the system or the application servers once enough new content becomes available to generate new personalized menus reflecting new and different combinations of new and preexisting media assets. The computing device may generate media menus as discussed above with respect to FIGS. 3A-B. The user's navigation of the personalized media interface may also initiate a request to view menu pages such as those of FIGS. 3A-B, and consequently may initiate a request to generate personalized menus.

If such a request has been received, then in step 804, the menu category for the personalized menu to be generated may be identified. The menu category may be identified by determining potential search queries that users are most likely to input. By identifying the types of media content that are popular with users, by identifying the newly available media assets, and/or by identifying new combinations of new and preexisting media assets, the computing device may be able to best analyze media attributes or combinations of media type identifiers that users are most likely to be interested in. For example, by observing several users' media consumption histories, by noting that there are several new superhero television show episodes and by noting the menu categories of preexisting menus, the system may determine that several users would be interested in watching media assets related to action television shows about superheroes. In this case, the computing device has determined that the user is most interested in the combination of a genre of action a theme of superheroes. Accordingly, the computing device identifies the menu category to be action television show about superheroes.

In step 805, upon identifying the menu category for a new media asset list, a list of media assets matching the identified menu category may be generated. By searching for media assets that contain metadata or media tags with the parameters identified in the combination of media identifiers of the identified menu category, the media assets to be included in the list of media assets may be found. Media assets matching the parameters set by the identified menu category are included in a media asset list associated with the menu category. The generated menu may be stored for future usage.

Once media asset lists for each menu category have been generated, in step 806, the media asset lists may be selected for display at a user device based on the level of interest that the user of the device would have in each generated media asset list. For example, the media asset lists generated in step 805 may be further analyzed to determine whether the user would be interested in watching the identified media assets and the level of interest the user would have in watching each of the identified media assets. For example, each of the identified media assets' metadata parameters may be examined to quantify the level of interest the user would have in watching each of the assets. The media consumption score associated with each of the identified media assets may be analyzed with respect to the user to quantify the level of potential user interest in each of the identified media assets. The computing device may select only a select number of the generated media assets that have been determined to exceed a threshold amount of potential user interest for display at the user media interface of the user's device. Accordingly, each of the media assets in the media asset list is determined to be of user interest such that only media assets with a high confidence value for the level of user interest are recommended to the user in order to not break the user's trust in the recommended media assets.

In step 807, the media assets in the media asset list may be ranked in order of user interest based on the monitored media consumption of users. After select media asset lists having media assets determined to be of sufficient user interest have been generated and selected for display at a user device, the media assets in such selected media asset lists are arranged in an order of descending potential user interest. For example, the order in which media assets are arranged in the media asset list may be rearranged according to descending media consumption score. The media asset list may be displayed to the user in a menu page as illustrated in FIGS. 3A-B according to that order.

Once personalized media asset lists have been generated and the media assets in these media asset lists have been arranged in order, the computing device may, in step 810, determine whether a request to consolidate menus has been received. Such a request may be issued periodically after a preset number of menus have been generated or after a preset number of menus for a given media tag are generated. It may be automatically determined that there are several similar menus that require consolidation. Minimizing redundancy in the presentation of the recommendation menus helps to ensure that the user is provided with a wider range of options when viewing the recommendation menus.

Figure 8A:
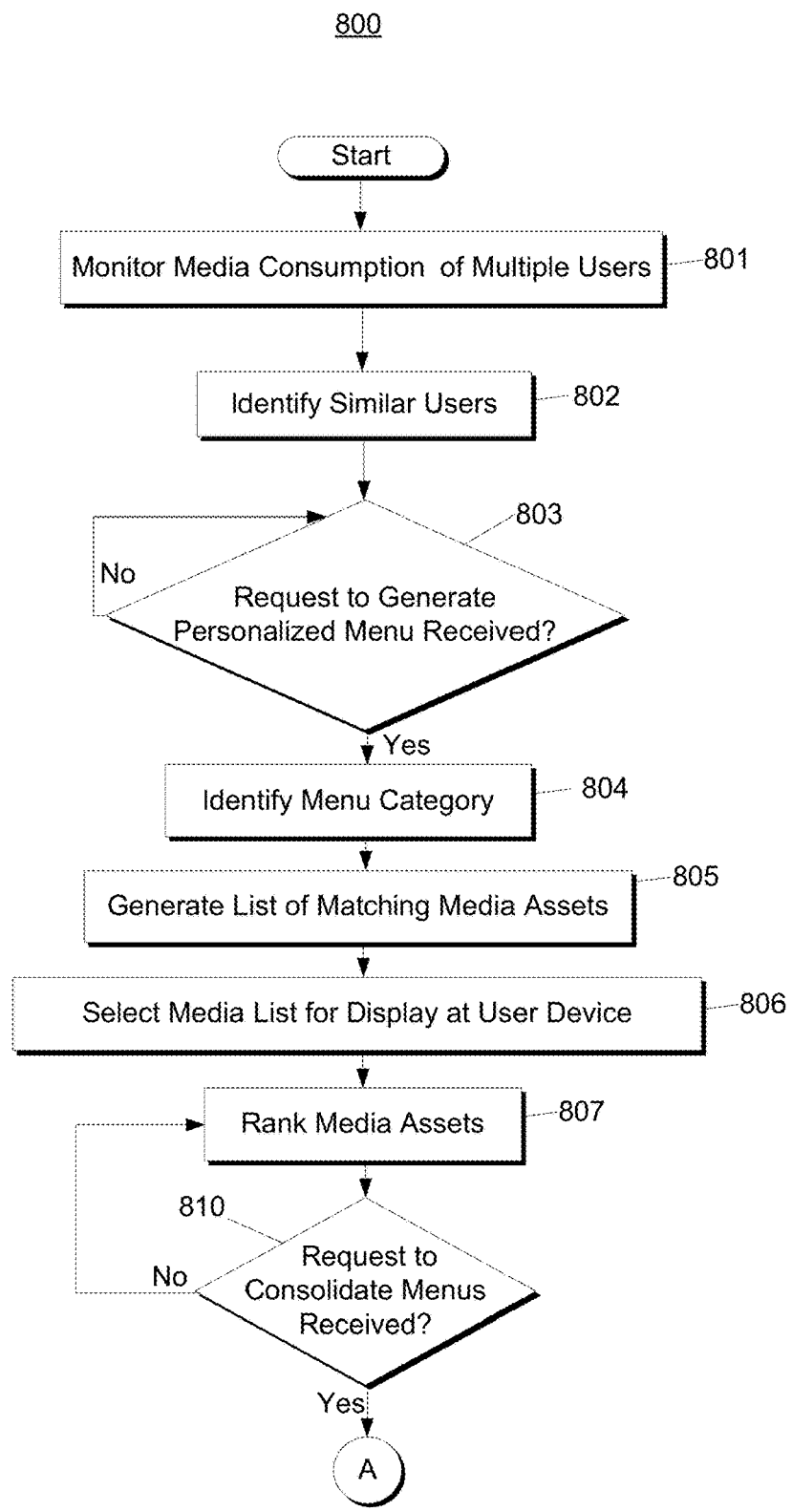
FIGS. 8A-G illustrate an example algorithm illustrating features described herein.
Figure 8B:
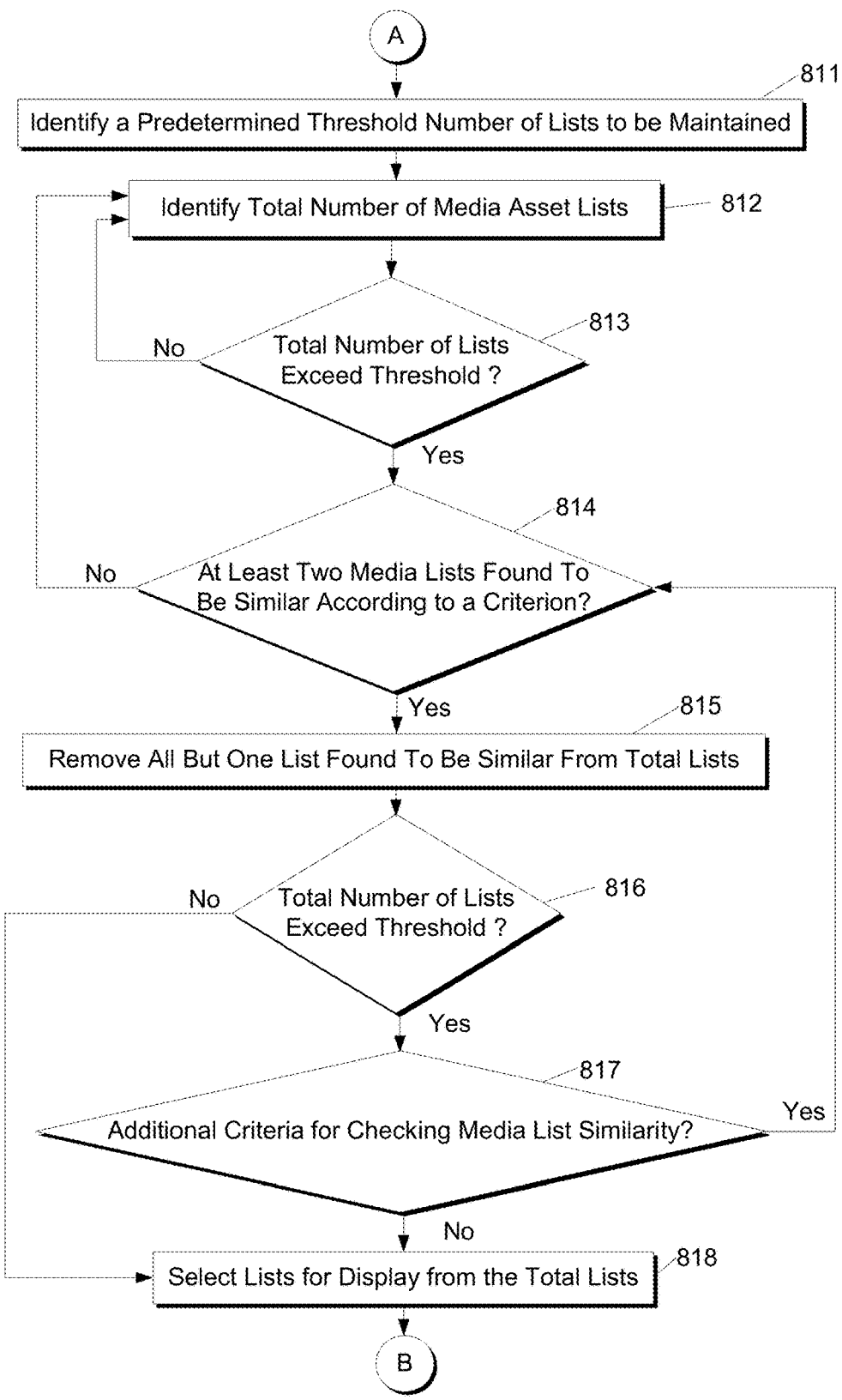

In step 811, upon receiving a request to consolidate menus, a predetermined threshold number of media asset lists to be maintained may be identified, as shown in FIG. 8B. For example, the number of media asset lists that should be maintained in total may be identified. Alternatively or additionally, the number of media asset lists to be maintained per menu category may be identified. Such number of media asset lists to be maintained may be updated by determining the total number of media asset lists that can be processed given the available resources of the system (i.e., memory, computing power etc.). Alternatively or additionally, an administrator at the application server may specify the total number of media asset lists that can be maintained.

In step 812, the total number of media asset lists that currently exist may be identified. The number of existing lists may be continuously monitored by keeping track of the new media asset lists that are generated by the system.

Once the total number of media asset lists that currently exist is identified, in step 813, the computing device may determine whether the total number of currently existing media assets exceeds the threshold number of lists to be maintained. For example, the computing device may compare the total number of media asset lists with the threshold number of media asset lists to be maintained. If the total number of lists does not exceed a threshold, the method may return to step 812 to monitor the total number of lists until the total number of lists exceeds the threshold number.

In step 814, if the total number of currently existing media asset lists is determined to exceed the threshold number of lists to be maintained, the computing device may determine whether at least two different media asset lists are found to be similar according to a criterion. If no two lists in the currently existing media asset lists are identified to be similar, then the method may return to step 812 to monitor the total number of currently existing media asset lists until new media asset lists are created which may be similar to the currently existing media asset lists.

One such criterion for media asset lists similarity may be if at least two media asset lists contain more than a threshold number of the same media assets between the two of them. For example, if 70% of the media assets in a media asset list are shared in common with another media asset list, then the two media asset lists are similar. The computing device may determine on a per media asset list basis, the number of media assets shared across the plurality of media asset lists.

Another criterion for media asset list similarity may be if at least two media asset lists contain more than a threshold number of the same media assets having the same title between the two of them. For example, if 70% of the media assets in a media asset list have the same titles as media assets in another media asset list, then the two media asset lists are similar. The computing device may determine, on a per media asset list basis, the number of media assets having substantially similar titles across the plurality of media asset lists. Occasionally, many of the same media assets are listed in different media asset lists but cannot be identified as the same media asset due to non-media content differences such as formatting (e.g., an SD or HD version of the same program) or perhaps because they have not been assigned the same media tags. By checking for similar titles however, the same media assets may be identified even if they are formatted differently or for some reason have different media tags associated with them. If a subset of one or more of the identified plurality of media asset lists have more than the threshold number of media assets having similar titles in common with media assets of the given media asset list, then the given media asset list is determined to be similar to the identified subset of media asset lists.

Another criterion for media asset list similarity may be if at least two media asset lists contain more than a threshold number of media assets with similar media tags shared in common between the two of them. For example, the computing device may compare each list with all other lists to find the media asset lists whose listed programs have the same media tags. For example, the computing device may determine that the media asset list for television shows with Gordon Ramsey contains ten media assets with the media tags of "cooking television show genre," "reality television show genre," "angry chef theme," and/or "comedy genre" and that another media asset list for comic reality television shows with an angry chef also has ten media assets with the same media tags. If a subset of one or more of the identified plurality of media asset lists have more than the threshold number of media assets having similar tags in common with media assets of the given media asset list, then the given media asset list is determined to be similar to the identified subset of media asset lists.

In step 815, if at least two media asset lists are found to be similar according to any of these criteria, all but one media asset list of the at least two media asset lists found to be similar may be removed from the total number of media asset lists maintained by the system. All lists that are determined to be similar to another preexisting media asset list may be removed in order to keep the number of total lists below the predetermined threshold number of lists to be maintained by the system.

In step 816, upon removing media asset lists determined to be similar according to one criterion from the system, it may be determined whether the total number of lists exceeds the predetermined threshold number of lists to be maintained. For example, the computing device may identify the total number of media asset lists remaining after the media asset lists determined to be similar according to one criterion are removed with the threshold number of media asset lists to be maintained. If the total number of media asset lists does not exceed the threshold, then the method may proceed to step 818 to select which lists from the currently existing lists are to be displayed at a user device.

In step 817, if the total number of currently existing media asset lists is determined to exceed the threshold number of lists to be maintained, the computing device may determine whether there exist any additional criteria for checking media asset lists similarity that have not been used for the removal of similar media asset lists. If there are additional criteria for checking media asset list similarity, then the method may return to step 814 to execute another pass of checking for media asset list similarity according to the unused criterion. If no additional criteria for checking media asset list similarity remain and the total number of currently existing lists still exceeds the threshold number of lists to be maintained, the criterion for media asset list similarity may be relaxed to remove additional media asset lists. Alternatively or additionally, the threshold number of media asset lists to be maintained may be increased.

In step 818, the media asset lists may be selected for display at a user device from the media asset lists left remaining after one or more passes of media asset list similarity removal. For example, the remaining media assets lists may be further analyzed to determine whether the user would be interested in watching the identified media assets and the level of interest the user would have in watching each of the identified media assets. The computing device may select only a select number of the identified remaining media assets that have been determined to exceed a threshold amount of potential user interest for display at the user media interface of the user's device. In some embodiments, such a selection of media asset lists for display may be received from the user. In another embodiment, such a selection of a representative media asset list may be received from a system operator at the media provider or at a media guide backend office. In yet another embodiment, such a selection may be automatically made by the computing device by monitoring which media asset lists are displayed in media interfaces of other users and which media asset lists are most popular with users identified to be similar to the given user.

Figure 8C:
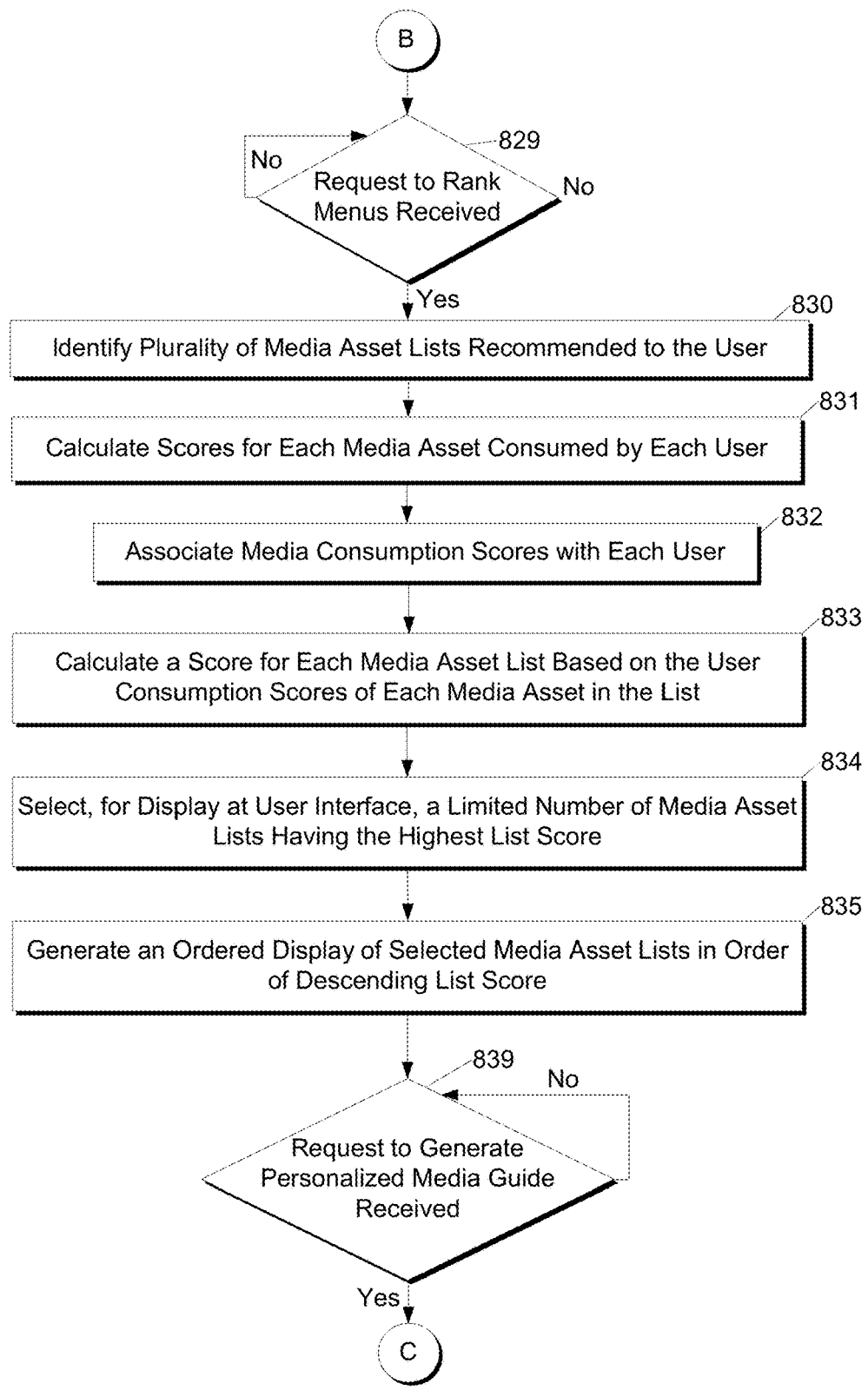

In step 829, as shown in FIG. 8C, once redundant media asset lists have been removed, the computing device may receive a request to rank a plurality of different menus or media asset lists with respect to each other. Such a request may be automatically generated by the system upon determining that media assets have been selected for display at a user device. In order to personalize a page of recommended menus to the user as best as possible, media asset lists that are determined to be of the greatest user interest may be ranked higher and displayed before the remainder of the recommended media asset lists. Accordingly, the computing device may automatically periodically request to rank a plurality of different media asset lists in an effort to keep the media page personalized with the generation of new media asset lists.

In step 830, upon receiving the request to rank different media asset lists, a plurality of media asset lists recommended to the user may be identified. For example, the computing device may determine which of the generated lists will be generated for display by checking user preferences for types of lists the user would like to view.

In step 831, consumption scores may be calculated for each media asset consumed by each user. By monitoring the consumption history, browsing history, media preferences of the user and users with similar media preferences, a consumption score may be calculated for each media asset, which is a quantization of the level of interest a given user may have in viewing that media asset. Such a score may be calculated by determining the media tags associated with the media asset and by determining the level of interest the user would have in the media asset given its unique combination of media tags. For example, the computing device may assign media attribute tags with certain scores. If it is determined that the user likes comedy movies, the computing device may assign comedy movies with a high score. But if it is determined that the user does not like media content with dark tone, the computing device may associate the dark tone media attribute with a low score. Accordingly, a composite score may be calculated for a dark comedy movie by compositing the scores for dark tone with the score for comedy movies.

Score calculation may factor in the frequency with which the user consumed certain types of media content. For example, media assets that are determined to be of the genre that the user frequently watches may be associated with a high score. High scores may be assigned to media assets having a comedy tag if it is determined that the user watches comedy programs frequently. However, media assets that the user has recently watched may be assigned a low consumption score in order to not recommend content that the user has very recently watched again to the user. The consumption score may be a dynamic score that changes over time such that recently watched media contents' scores increase significantly as more time passes.

Score calculation of the media asset may also take into account the device and time at which the media asset list is being presented to the user. Each device may have different consumption patterns and the calculated score may reflect such differences in each of the media asset scores. For example, more children's cartoons may be viewed in the living room television than in the parent's bedroom television. Accordingly, scores for children's cartoons may be higher if they are being recommended to the living room television than to the parent's bedroom television. By monitoring media consumption history, the computing device may determine that the user has a preference for certain types of media content at certain time of the day. For example, the computing device may determine that the user(s) may prefer to watch news at 6 PM every day in the living room television. Accordingly, the media consumption scores associated with news programs scheduled to be displayed at 6 PM at the user device may be much higher than scores associated with news programming scheduled to be displayed at other times.

In step 832, the calculated scores for each media asset may be associated with the media asset and stored in a database. For example, the computing device may store the calculated score for each media asset for a given user device locally at the given user device or at a server. The score may be associated with the particular user device and the user account. In another embodiment, the score for each media asset may be associated with a plurality of user profiles if it is determined that a plurality of different users consume content at a given user device. Such a score may indicate that the media content score is based on the consumption history, browsing history, and preferences of a composite user viewership of a plurality of users.

In step 833, a score for each media asset list may be calculated based on the user consumption scores of the media assets in each list. The media asset list score may be calculated based on the quantity of media assets that have a high consumption score and the scores of such media assets. Such a media asset list score may be stored at the user device or at a remote server.

In step 834, a limited number of media asset lists having the highest media asset list score may be selected for display at a user interface. There may be an upper limit for the number of media asset lists that can be displayed on a certain menu page of the personalized media interface. Accordingly, the computing device may determine how many media asset lists the menu page can display at maximum and select that many media asset lists having the highest media asset list scores from the plurality of media asset lists.

In step 835, an ordered display may be generated of the limited number of media assets selected for display in order of descending media asset list score. The media asset lists may be ordered in descending order starting so that the most recommended media asset list (i.e., the media asset list with the highest media asset list score) will be displayed at the user interface before all other media asset lists. Accordingly, only a preset number of media asset lists having the highest score of all media asset lists matching the criteria required for display at the user interface that have been selected in step 834 may be ordered in a descending order based on their media asset list score.

Alternatively or additionally, a personalized media schedule guide may be generated and/or displayed. Accordingly, in step 839, once enough user consumption history has been sufficiently monitored to gather user consumption data for media assets, the computing device may determine whether a request to generate a personalized media guide has been received. Such a request may be received from the user when the user activates an option in the personalized media interface to view the schedule of media asset listings using an input device. In another embodiment, the computing device may monitor whether the user has pressed a "Guide" switch on his remote control user input device that has a sole function of displaying a media asset schedule. The computing device may continuously or periodically check whether such a request to view the media asset schedule has been received at any time after the personalized media interface is displayed on the user device.

Upon determining that a request to generate and/or display the personalized media schedule guide has been received, an ordered display may be generated of multicast media asset listings and on-demand media asset listings categorized by media provider and the scheduled availability time of media assets. For example, a grid organized by columns of scheduled multicast time and rows of media providers may be generated. Media asset listings may be arranged for multicast media assets in the appropriate cells based on their media provider and scheduled multicast time (e.g., the times when the various programs will be aired by their respective networks). If there is no set multicast time (i.e., the on-demand assets are always available), the on-demand media assets may be organized at times that it determines the user will be most likely to view the on-demand media asset based on the user's monitored media consumption patterns and preferences.

Figure 8D:
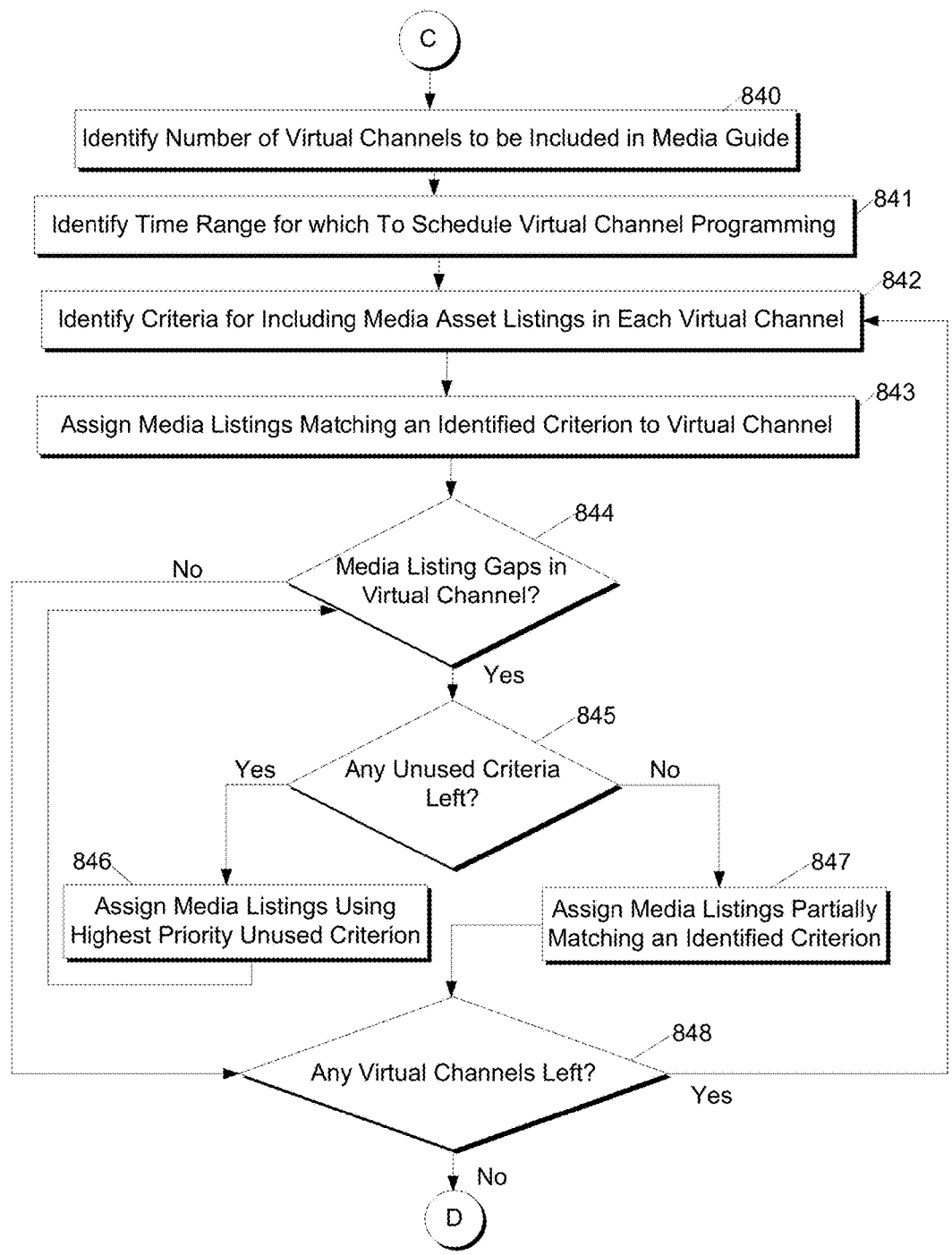

In step 840, as shown in FIG. 8D, upon generating the display of any multicast media channels and on-demand channels in the personalized media schedule guide, the number of virtual channels to be included in the media schedule guide may be identified. The number of virtual media channels may be identified by determining from the media consumption history whether the user prefers to watch only multicast media assets from multicast media channels, on-demand media assets from on-demand media channels, or whether the user prefers to watch certain types of media content from a variety of multicast and on-demand media providers. Upon determining the user preference for certain media content attributes (i.e., genre, tone, theme, actors, etc.), the virtual channels may be generated having menu categories corresponding to combinations of such user preferred media content attributes.

In step 841, upon determining which virtual channels will be included in the media guide, the time range for scheduling virtual channel programming may be determined. For example, the computing device may determine what time range to display in a personalized media schedule screen such as screen 600 of FIG. 6. The time range spanned by the virtual channels and the media guide in FIG. 6 is from 5 PM to 7:30 PM and accordingly, media assets may be scheduled in virtual channels for this time duration in the media guide.

In step 842, the criteria for including media asset listings in each virtual channel may be identified. For example, the computing device may identify the common media attribute combination for media assets in each particular virtual channel. For example, as shown in FIG. 6, virtual channel 624 included media assets that shared the common media attribute of reality television. Such criteria may include a single media attribute or a combination of multiple attributes.

In step 843, media asset listings for matching the identified criterion for each virtual channel may be assigned to the virtual channel. Multicast and on-demand media asset listings of interest to the user may be selected from a plurality of media providers. In some embodiments, media asset listings may be arranged for the selected multicast media assets in the virtual channel according to the scheduled multicast time of the selected multicast media assets. For example, a media asset listing may be generated in the row of a virtual channel displayed in the personalized media schedule for the selected multicast media asset. A plurality of different media asset listings for different multicast media assets may be included at different multicast time slots from different media providers in one virtual channel. If the computing device determines that the user will be much more interested in viewing the multicast media asset at a later time than the multicast time, a DVR may be instructed to record the multicast media asset and place the media asset listing for the multicast media asset at the time that the user will be most interested in viewing it. At such a time, if the user selects such a media asset listing for playback, the DVR may be instructed to play back the previously recorded multicast media asset corresponding to the media asset listing.

In step 844, upon populating the virtual channel with media asset listings for media assets that the user is most likely to be interested in, the computing device may determine whether there exist any empty time slots without any media asset listings, referred to herein as media asset listing gaps, for the virtual channel. Such a determination may be made by examining whether there exist any time slots in the virtual channel that have not been populated with media asset listings for multicast media assets of interest to the user. If it is determined that there are no such media asset listing gaps in the virtual channel, then the method may proceed to step 848 to determine whether there are any other virtual channels to assign media asset listings to.

In step 845, if it is identified that there exist media asset listing gaps in the virtual channel, then, the computing device may further determine whether there are any unused criteria left to select media assets to list in the media asset listing gaps. The unused criteria may be ranked in an order of priority, either automatically by the system or manually by a backend system administrator or even the user. Media assets matching the highest priority of unused criteria may be first used to fill the media asset listing gaps and if there still exist gaps, lower priority unused criteria may be used to select media assets to fill the media asset listing gaps.

One criterion used to select media assets to list in the media asset listing gaps is whether any on-demand media assets match the media attribute criteria identified in step 842 for including media asset listings in that virtual channel. Media asset listings for on-demand media assets that the user would be most interested in from on-demand media sources may be selected to populate the media asset listing gaps in the virtual channel. For example, the media asset listings for on-demand media assets may be selected upon determining the level of interest that the user will have to view the media asset at the time period corresponding to the media asset listing gap. A media asset listing may be generated in the row of a virtual channel displayed in the personalized media schedule for the selected on-demand media asset and place the generated listing in the time slot corresponding to the media asset listing gap. A plurality of different media asset listings for different on-demand media assets may be included at different time slots corresponding to different media asset listing gaps from different media on-demand providers in one virtual channel. Additionally, media asset listings may be generated for media assets stored locally at the user device (i.e., at the user's DVR, removable media, or hard drive) if it is determined that the user would be most interested in viewing those media assets at the time period corresponding to the media asset listing gap.

Another criterion used to select media assets to list in the media asset listing gaps may be whether there exist unwatched episodes of media series that the user regularly watches. For example, the computing device may determine that the user regularly watches episodes of the media series "Game of Thrones" and that there exists at least one unwatched episodes.

Another criterion used to select media assets to list in the media asset listing gaps may be whether there exist media assets that are extremely popular with users that have similar viewing preferences as the user that the user has not watched. For example, a user who may watch episodes of the media series "Friends" may have never watched episodes of "Seinfeld," which are extremely popular with other users who regularly watched episodes of "Friends."

In step 846, if it is determined that that there are unused criteria with which to select assets to list in the media asset listing gaps, media asset listings may be assigned using the highest priority unused criterion. The computing device may determine which of the unused criteria has the highest priority and use that rule to select media assets to list in the media asset listing gap. Upon identifying media assets that match such criteria, such media assets may be listed in the media asset listing gaps at a time at which the user is most likely to be interested in viewing them. Upon listing media assets from the highest priority unused criteria, the method may proceed to step 844 to further check whether there are any additional media asset listing gaps.

In step 847, if it is determined that that there are no unused criteria with which to select assets to list in the media asset listing gaps and there still are media asset listing gaps, media assets that partially match an identified criteria for including media assets in the virtual channel may be listed in the virtual channel. For example if the criteria for including media assets in step 843 is improvisational comedy television shows, media assets matching a related subgenre such as slapstick comedy movies may be listed.

Once the media asset listing gaps in the virtual channel are filled with media asset listings, it is determined whether there are any other virtual channels left to schedule media assets in. The computing device may determine whether the number of virtual channels filled with media asset listings equals the number of virtual channels identified to be included in the media guide at step 840. If there are still virtual channels that have not been assigned media asset listings, the computing device may perform steps 842-847 for such virtual channels.

Once all channels including virtual channels are populated with media asset listings, the media schedule guide display may be complete and the computing device may display the generated media schedule grid to the user on the personalized media user interface. Each media asset listing may be user selectable. The user may be allowed to provide feedback on how interesting the user finds the content corresponding to each media asset listing. The user may also be allowed to move the media asset listing to a different time slot by dragging and dropping the media asset listing from one time slot to another in the media schedule grid using a user input device. The user may also have the option of activating an option on a media asset listing to begin "binge watching" a series corresponding to the selected episode. The act of "binge watching" refers to watching successive episodes of a media asset series without watching a different media asset until the user has completed watching all episodes of a media series.

Figure 8E:
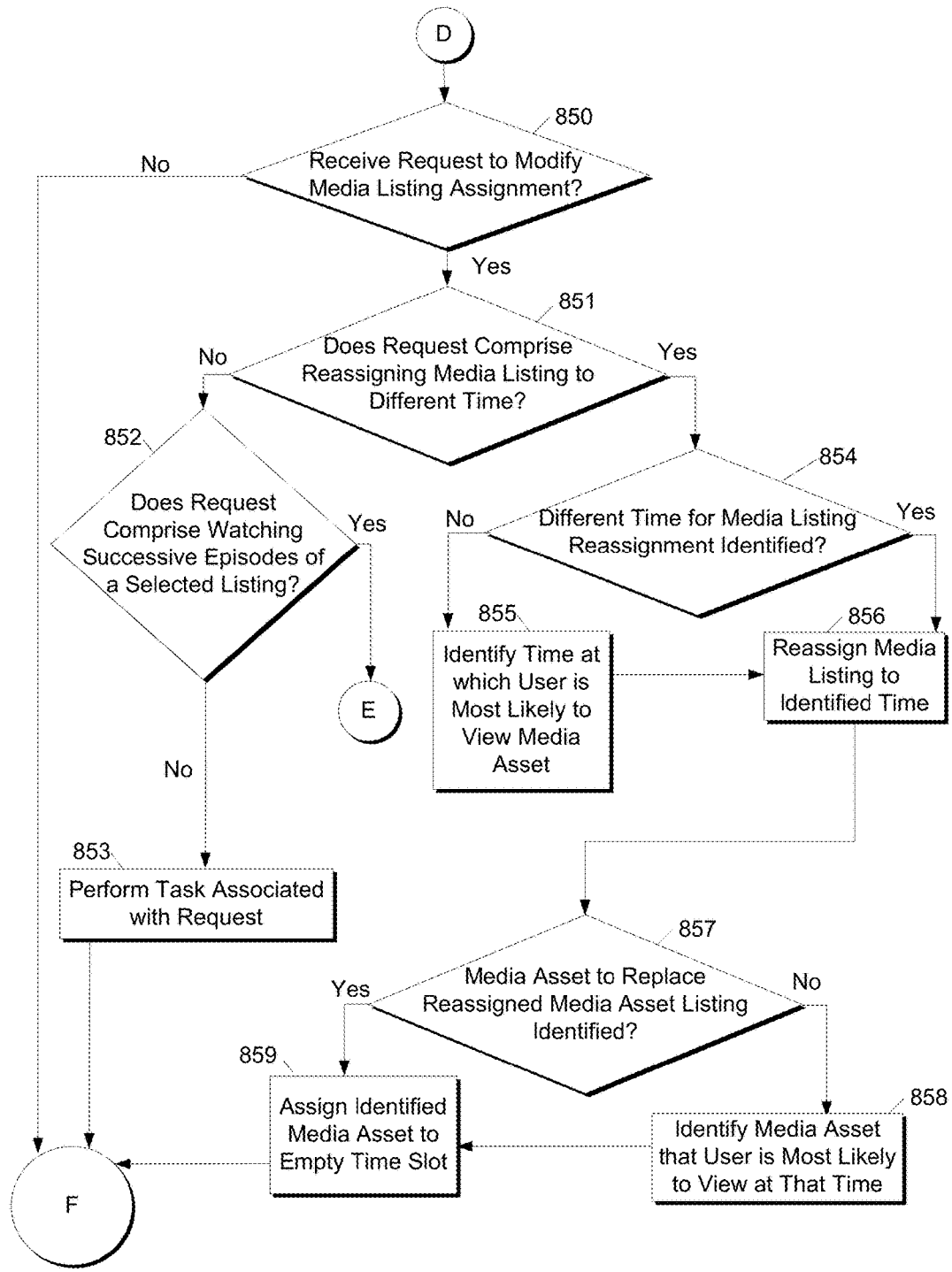
Figure 8F:
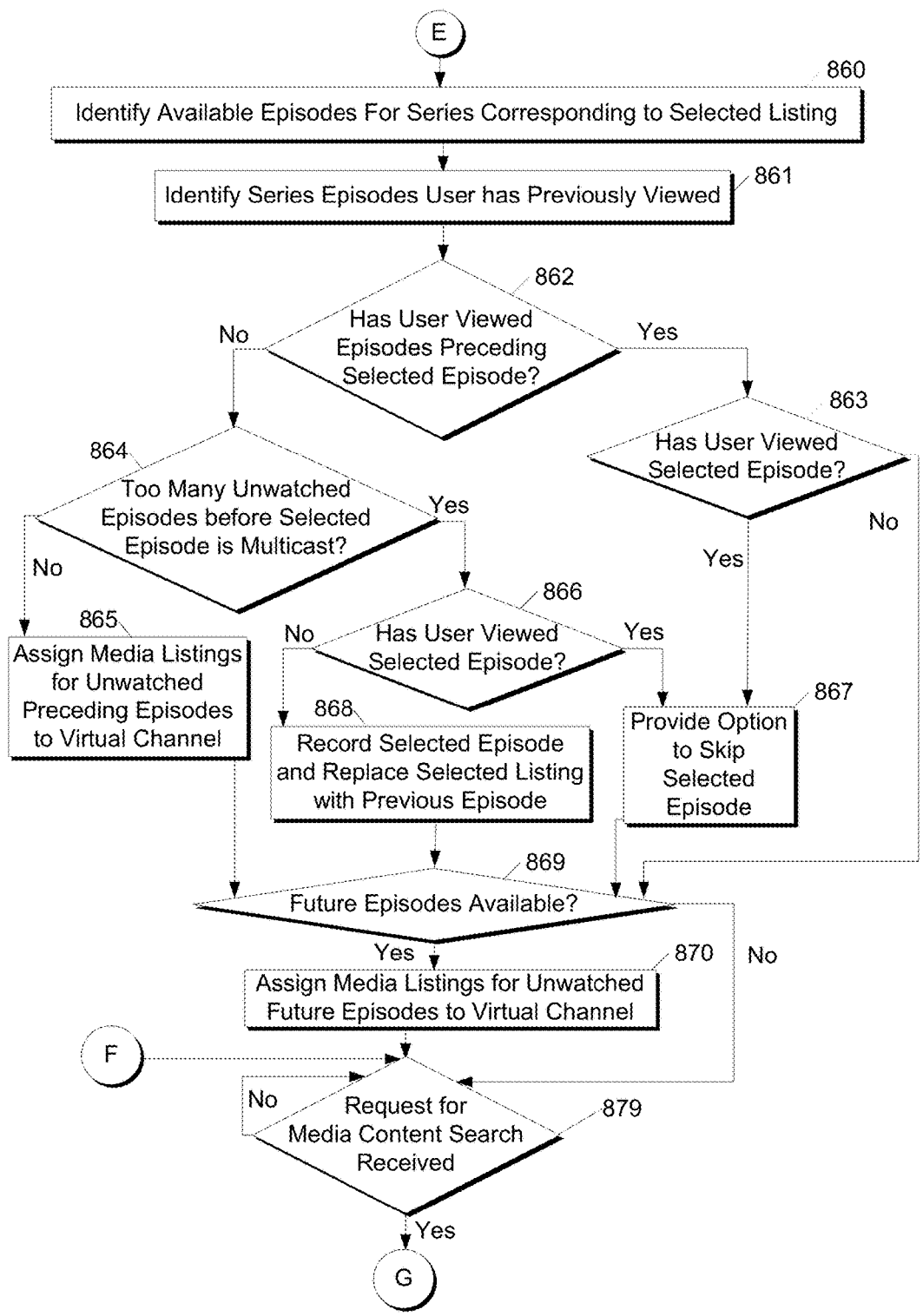

In step 850, as shown in FIG. 8E, the computing device may determine whether it has received a request to modify a media asset listing assignment in the media schedule guide. For example, the computing device may monitor whether the user has selected to change the display arrangement of media asset listings by either removing the selected media asset listing, replacing the media asset listing with another media asset's listing, moving the selected media asset listings to a different time slot, selecting an option to being begin watching the series corresponding to the selected media asset listing, or by performing any other action that requires at least one media asset listing to be replaced from its previously assigned time slot. If a request to modify the media asset listing is not received, then the method may proceed to monitor whether a request is received to search media content at step 879 as shown in FIG. 8F.

In step 851, upon receiving a request to modify the media asset listing assignment, the computing device may determine whether the request comprises reassigning the media asset listing to a different time slot from the one at which it is currently scheduled. Certain user actions such as dragging and dropping media asset listings using a cursor on the media schedule guide interface and selecting an option to reschedule the media asset listing may be interpreted as actions that comprise reassigning the selected media asset listing to a different time.

In step 852, if it is determined that the request does not comprise reassigning the media asset listing to a different time, the computing device may determine whether the request comprises watching successive episodes of the selected media asset listing ("binge watching"). The computing device may determine that the request comprises binge watching if the user selects a binge watching option on the selected media asset listing (e.g., pressing a "start marathon" button 566 on FIG. 5B). If such an option is enabled, the method may proceed to step 860 to identify the available series episodes of the selected media asset listing. Alternatively or additionally, the computing device may monitor whether the user has activated a "binge watch" button on his remote control user input device to begin "binge watching" of the media series corresponding to a selected media asset listing.

However, in step 853, if it is determined that the request does not comprise a command to watch successive episodes of the selected media asset listing, the task involved with the request may be performed. For example, the request to modify the media asset listing may involve removing the media asset listing, replacing the selected media asset listing, or assigning positive feedback or negative feedback for the media asset associated with the media asset listing. If any request to modify the media asset listing is received, the computing device may perform such tasks specified by the request without changing the placement of the selected media asset listing in the media schedule screen. If the user selects a thumbs up or a like button on the media asset listing to indicate that he likes the media content for that listing, a media asset listing for a similar media asset may be placed on the media schedule screen, replacing a previously recommended media asset listing having the lowest consumption history score of all the media asset listings displayed on the media schedule screen. If the user selects a thumbs down or a dislike button on the media asset listing to indicate that he dislikes the media content for that listing, the computing device may remove the selected media asset listing from its assigned time slot and may replace the selected media asset listing with another media asset listing for a different media asset as described in steps 844-847 for filling media asset listing gaps in the virtual channel.

In step 854, if it is determined that the request comprises reassigning the media asset listing to a different time, then in step 854, the computing device may further determine whether the time to which the selected media asset listing is to be rescheduled is identified. For example, the user may have specified a time to reschedule the selected media asset listing when selecting an option to reschedule. Alternatively or additionally, the user may have dropped the selected media asset listing on a particular time slot. The computing device may identify the time slot at which the selected media asset listing is dragged and dropped on as the rescheduled time.

In step 855, if it is determined that the rescheduled time for the media asset listing being reassigned is not identified, a time may be identified at which the user is most likely to view the asset. The media asset listing, its media attributes, and/or the user's media consumption history may be analyzed to determine a rescheduled time at which the user is most likely to view the media asset listing.

In step 856, if it is determined that the rescheduled time for the media asset listing being reassigned is identified, the media asset listing may be reassigned to the identified time. If there is another media asset listing already occupying the time slot to which the media asset listing is rescheduled, the computing device may reschedule that other media asset listing to a different time if the current media asset listing would be of greater user interest to the viewer at the rescheduled time than the other media asset listing.

In step 587, upon reassigning the media asset listing, the computing device may determine, whether a media asset has been identified to replace the reassigned media asset listing. For example, the computing device may identify whether a user has previously dragged and dropped or scheduled a media asset listing to the time slot occupied previously by the now reassigned media asset listing. In some embodiments, when a new media asset is made available, the computing device may determine that that the new media asset is better fit for a particular times slot of the media schedule guide than the currently scheduled media asset listing and reschedule the currently scheduled media asset listing in favor of listing the newly available media asset at that time slot.

However, in step 858, if a media asset has not been identified to replace the reassigned media asset listing, a media asset may be identified that the user may be most likely to view at the time slot previously occupied by the reassigned media asset listing. The computing device may analyze the media asset listing, its media attributes, and the user's media consumption history to determine a rescheduled time at which the user is most likely to view the media asset listing.

However, in step 859, if a media asset has been identified to replace the reassigned media asset listing, the identified media asset may be assigned to the empty time slot previously occupied by the reassigned media asset listing. Once a media asset is listed in the empty time slot, the media schedule guide is once again ready for display, the computing device may further monitor for any other media schedule changes by the user or may monitor whether a request for media content search has been received in step 879.

In step 860, as shown in FIG. 8F, in response to a determination a request to watch successive episodes of the selected media asset listing has been received, the available series episodes corresponding to the media series of the selected media asset listing may be identified. For example, the metadata of the media asset listing or the metadata of the media asset associated with the media asset listing may be analyzed to identify which media series the selected media asset listing corresponds to. Furthermore, the computing device may also identify which episode of the media series the selected media asset listing corresponds to by analyzing the metadata of the selected media asset listing or its media asset. The available media assets may be searched to identify all available episodes of the media series.

In step 861, upon identifying the available series episodes, the series episodes that the user has previously viewed may be identified. The computing device may make such a determination by analyzing the media consumption history of the user.

In step 862, once the series episodes that have previously been viewed by the user have been identified, the computing device may determine whether the user has viewed all of the series episodes preceding the series episode corresponding to the selected media asset listing. The computing device may identify the episodes that precede the currently selected episode from the available series episodes and then determine which of these episodes the user has previously viewed.

In step 863, if the user has viewed all episodes preceding the selected episode, the computing device may determine whether the user has previously viewed the episode corresponding to the selected media asset listing. By determining whether the user has previously viewed the currently selected episode, the computing device may identify that the episodes to be binge watched are limited to episodes that follow the currently selected episode.

In step 864, if the user has not viewed at least some episodes preceding the selected episode, the computing device may determine whether the number of unwatched available episodes preceding the selected episodes is too high in number for all unwatched available episodes to be scheduled before the scheduled multicast time of the selected episode. For example, the computing device may determine that the total time required to watch the episodes preceding the selected episode that the user has not watched back to back from the time at which the media asset listing was selected would be greater than the time available until the selected media asset listing is scheduled to be multicast. This determination allows the computing device to determine whether the user can be caught up on all previous episodes of the media series before the selected episode is multicast.

In step 865, if there are not too many unwatched episodes before the selected episode is multicast, media asset listings for all unwatched episodes preceding the selected episode may be assigned to the virtual channel. These unwatched preceding episodes may be scheduled in successive time slots preceding the time slot corresponding to the selected media asset listing. The media assets previously scheduled in the virtual channel during these successive time slots with media asset listings may be replaced by the identified series episodes. For example, media asset listings located in the virtual channel time slots preceding the currently selected media asset listing for "binge watching" may be removed and replaced with media asset listings for all identified episodes of successive episodes. Next, the method may proceed to step 869 to determine whether future series episodes or episodes following the selected episode are available.

In step 866, if there are too many unwatched episodes before the selected episode is multicast, the computing device may determine whether the user has viewed the selected episode. If the user has indeed viewed the selected episode, the method may proceed to step 867 to skip the display of the selected episode at its current time slot and display media asset listings for all the previously unwatched episodes in successive order on the virtual channel. If the option is chosen to skip the selected episode, the computing device may remove the selected media asset listing from the virtual channel and instead display media asset listings for all the previously unwatched episodes in successive order on the virtual channel.

In step 867, if the user has viewed the series episode for the selected media asset listing and all previous series episodes, an option may be provided to the user to skip the selected episode. Selection of such an option by the user would trigger the computing device to remove the selected media asset listing from the media schedule guide. In some embodiments, this may only occur if it is known that unwatched episodes of the media series are available for binge watching. The selected media asset listing may be replaced with a listing for the earliest episode that has not been watched by the user.

In step 868, if the user has not viewed the selected episode and there are too many unwatched preceding episodes before the selected episode is multicast, the selected episode may be recorded and the selected media asset listing may be replaced with a media asset listing for one of the unwatched preceding episodes. The selected episode may be recorded in the DVR and all available unwatched episodes of the media series may be scheduled in successive time slots in the virtual channel. Since the selected media asset listing, if kept in its original position would disrupt the order of series episodes set for binge watching, the selected media asset listing may be removed from the virtual channel and rescheduled at a time slot after all the preceding unwatched episodes. The selected episode may be recorded at the DVR at its original multicast time. The rescheduled media asset listing for the selected episode, when selected for playback, may be retrieved for playback by the computing device from the DVR.

In step 869, if the user has not viewed the series episode for the selected media asset listing but has viewed all previous series episodes, the computing device may not alter the selected media asset listing but may determine whether future series episodes or episodes following the selected episode are available. Different multicast media channels, on-demand media channels, and/or the user's own DVR may be searched to determine whether there are any such subsequent episodes available for thoroughly binge watching the media series. Once the unwatched episodes preceding the currently selected episode have been scheduled in the virtual channel, the computing device may determine whether future series episodes or episodes following the selected episode are available. If such episodes are not available, the computing device may terminate scheduling binge watching episodes and proceed to step 879 to monitor whether a media content search request has been received.

However, in step 870, if series episodes following the selected series episode are available, media asset listings for all unwatched available episodes following the selected series episode may be assigned to the virtual channel. Media asset listings for these following episodes may be scheduled in the virtual channel in time slots immediately following the selected media asset listing or starting from the time slot of the selected media asset listing if an option to skip the selected media asset listing is chosen.

A user of the personalized media interface may also search for media content using a keyword search. In step 879, the computing device may determine whether a request for a media content search has been received. If no such request has been received, the computing device may continue monitoring for such a request to perform keyword search continuously or periodically. Such a request may be received if a user input into a keyword search area of a media user interface is detected. Additionally, such a request may also be received if user entry of a search button on a remote control user input device is detected by the computing device.

Figure 8G:
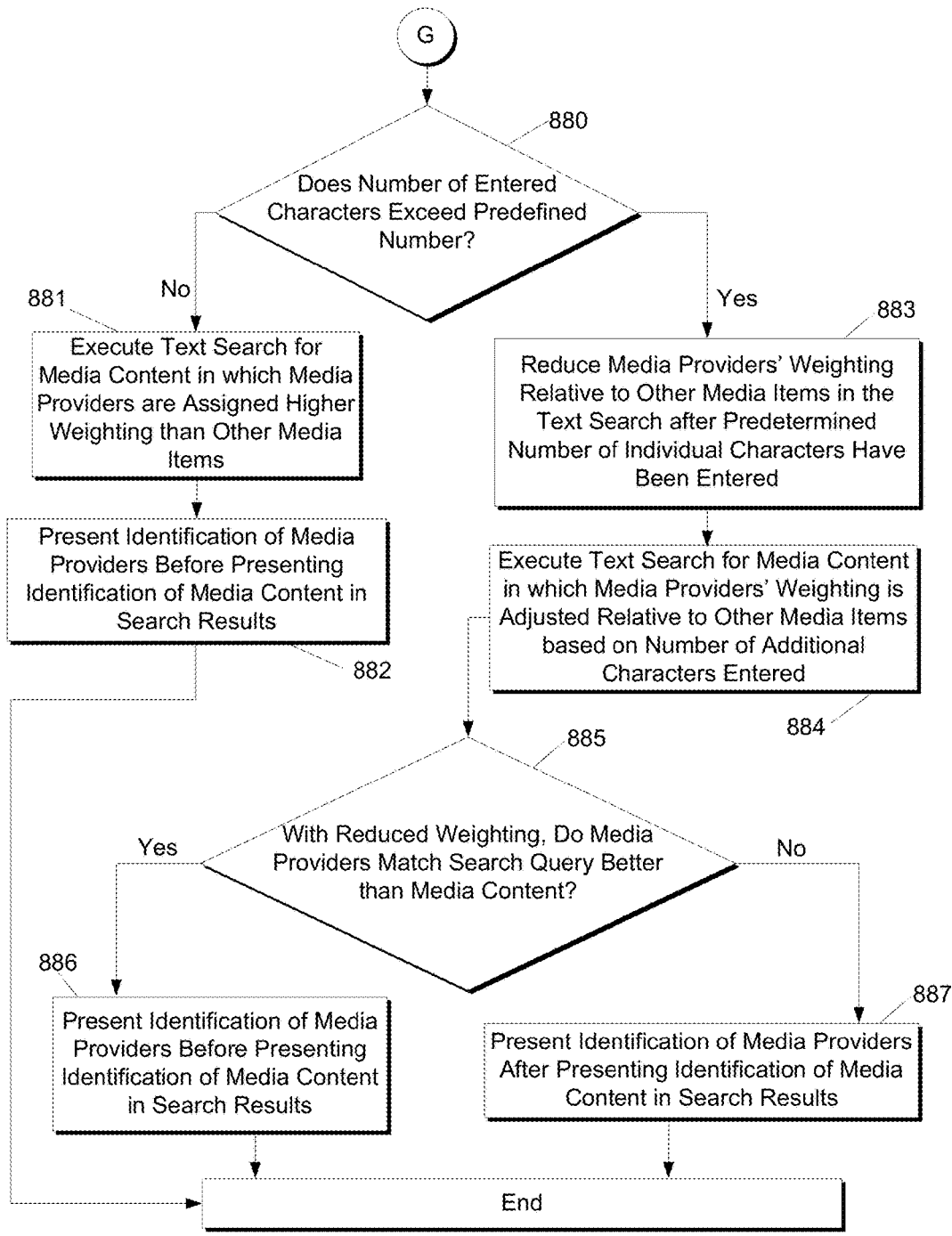

In step 880, as shown in FIG. 8G, once a request to perform a media search has been received, the computing device may determine whether the number of entered characters in a search query exceeds a preset threshold number of characters. User input of characters is closely monitored in order to determine how to weight different types of media search results. For example, user input search queries with less than four characters result in a higher weighting for media provider search results than any other type of media search results since it is determined that the user is more likely to be searching for a media provider than any other type of media content if the user input search query contains less than four characters. The predetermined threshold value may be user adjustable through the media user interface.

In step 881, if it is determined that the number of entered characters does not exceed the predefined threshold number of characters, a text search for media content may be executed in which media providers are assigned higher weighting than other media items, such as media assets. For example, as long as the computing device determines that the number of entered characters is less than the predefined threshold, then the text search may be executed to find media providers that best match the string of characters inputted into a text search area such as query 704 that is inputted into text search area 702 of FIG. 7. All possible media providers may be searched using the inputted search query before searching other media items such as media content assets.

In step 882, identification of media providers may be presented before presenting identification of media content in the search results. For example, a listing of the media providers that match the user entered search string may be displayed by the computing device above the listings for media assets matching the user entered search string in a search result display area on the media user interface. In another embodiment, the search results may be presented to the user verbally as a synthesized speech audio stream. In such an embodiment, the names of the media providers matching the input user search query might be played back as the name of the media provider before the names of the media content matching the user input search query is played back. A higher display weight may be assigned to media provider search results than to media asset search results but the degree of match to the entered search query may also affect the weighting of the results. Therefore in some other embodiments, some media provider search results that match search query well may be displayed above search results for media assets and some search results that do not match the entered search query may be displayed below media asset search results that better match search query.

In step 883, if it is determined that the number of entered characters exceeds the predefined threshold number of characters, the weighting assigned to search results may be reduced for other media items matching the user input search query such as media assets. For example, if the computing device determines that the input search string of "FOX Report," exceeds the predefined threshold of four characters for higher media provider weighting, the computing device reduces the weighting assigned to search results for media providers.

In step 884, the text search may be executed for media content in which media providers' weighting is adjusted relative to other media items (e.g., media assets) based on the number of additional characters present in the search query. For example, the weighting of search results may be decreased for media providers relative to search results for all other media items by a specific amount that is directly proportional to the number of characters in the input search query that are in excess of the predefined threshold number of characters. The text search is executed with such an adjusted reduced weighting for media providers search results relative to search results for any other media items. In some embodiments, the text search is iteratively executed by the computing device every time an additional character is entered in the search query. With every additional character entered, the computing device may reduce the weighting of search results for media providers by a specific quantity.

In step 885, once the text search has been executed with reduced assigned weighting to media provider search results based on the number of characters entered, the computing device may determine whether media providers, with reduced search result weighting, match the search query better than other media content items. Such a determination may be made by the computing device by matching the degree of match between the characters inputted in the search query and the search results. In an embodiment, negative weighting may be assigned to the media provider search results to deemphasize returning media provider search results for longer search queries. The degree of match between media provider search results and the search query may be measured and the negative weighting associated with the search results may be added. The computing device may determine whether the negatively weighted media provider search results still offer a higher degree of search result match than search results for other media content.

In step 886, upon determining that even with reduced search result weighting, media providers match the search query better than other media content items, identification of media providers may be presented before presenting identification of media content in search results. For example, listings for media providers that match the user entered search string may be generated for display above the listings for media assets matching the user entered search string in a search result display area on the media user interface. In another embodiment, the search results may be presented to the user verbally as a synthesized speech audio stream. In such an embodiment, the names of the media providers matching the input user search query might be played back as the name of the media provider before the names of the media content matching the user input search query is played back.

In step 887, upon determining that with reduced search result weighting, media providers do not match the search query better than other media content items, identification of media providers may be presented after presenting identification of media content in search results. For example, listings for media providers that match the user entered search string may be generated for display below the listings for media assets matching the user entered search string in a search result display area on the media user interface. In another embodiment, the search results may be presented to the user verbally as a synthesized speech audio stream. In such an embodiment, the names of the media providers matching the input user search query might be played back as the name of the media provider after the names of the media content matching the user input search query is played back.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. For example, in some embodiments steps 810-818, steps 829-835, steps 839-848, steps 850-870, and/or steps 879-887 may be performed simultaneously. In some embodiments, steps 801-807, steps 839-848, steps 850-870, and/or steps 879-887 may be performed simultaneously.

It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

What is claimed is:

1. A method comprising:
   determining, by a computing device and based on a user viewing history, a user viewing schedule indicating:
      a plurality of content items that a user is predicted to view, and
      corresponding times at which the plurality of content items are to be transmitted;
   determining, based on the user viewing history, a duration of a timeslot that is between scheduled transmission times of a first content item in the user viewing schedule and a second content item in the user viewing schedule;
   determining, based on the user viewing history, one or more recommended content items;
   determining, based on the duration of the timeslot, a third content item of the one or more recommended content items; and
   causing, by the computing device, output of a selectable option to output the third content item after the first content item and during the timeslot.

2. The method of claim 1, further comprising:
   receiving, by the computing device, an indication of the timeslot; and
   causing, based on the received indication of the timeslot, output of the third content item after the first content item and during the timeslot.

3. The method of claim 1, wherein the determining the third content item comprises:
   monitoring, for each of a plurality of different user devices, viewing of content by the user; and
   selecting different third content items to list in user viewing schedules of the plurality of different user devices, wherein the third content item listed in each user viewing schedule is based on content that has been viewed at a corresponding one of the plurality of different user devices.

4. The method of claim 1, wherein the determining the third content item comprises:
   receiving, by the computing device, a user input to view successive episodes of a recurring series of episodes corresponding to the second content item; and
   determining, by the computing device, an unwatched episode that precedes the second content item in the recurring series of episodes.

5. The method of claim 4, further comprising scheduling, in the user viewing schedule, the unwatched episode during the timeslot.

6. The method of claim 1, further comprising:
   determining, based on the user viewing history, one or more users with similar user viewing histories, wherein the determining the third content item is further based on one or more consumption scores, of the one or more users, for the third content item.

7. The method of claim 1, wherein the determining the third content item comprises:
   receiving, by the computing device, a plurality of characters of an input search string for a media search;
   determining, based on a character count of the plurality of characters satisfying a threshold, a relative weighting between media providers and media assets for the media search; and
   conducting the media search based on the relative weighting.

8. The method of claim 7, further comprising:
   ordering, for display and based on determining that the character count of the plurality of characters satisfies the threshold, search results for the media providers before search results for the media assets.

9. A method comprising:
   determining, by a computing device, a user viewing history that indicates, for each of a plurality of different user devices, viewing of content by a user; and
   for a first user device of the plurality of different user devices:
      determining, based on the user viewing history, a user viewing schedule indicating a plurality of content items that the user is predicted to view;
      determining, based on the user viewing schedule, a first duration of a time period between scheduled transmission times of a first content item in the user viewing schedule and a second content item in the user viewing schedule;
      determining, based on the user viewing history, one or more recommended content items;
      determining, based on a comparison of the first duration and a second duration of a third content item of the one or more recommended content items, the third content item; and
      causing output of the third content item after the first content item and during the time period.

10. The method of claim 9, further comprising:
causing, by the computing device, output of a display of an interface comprising the user viewing schedule, the interface comprising content listings for the plurality of content items that the user is predicted to view and a listing for the third content item, wherein the listing for the third content item is arranged in the user viewing schedule at a position corresponding to the time period.

11. The method of claim 9, wherein the determining the third content item comprises:
receiving, by the computing device, a user input to view successive episodes of a recurring series of episodes corresponding to the second content item listed in the user viewing schedule; and
determining, by the computing device, an unwatched episode that precedes the second content item in the recurring series of episodes.

12. The method of claim 11, further comprising:
scheduling, in the user viewing schedule, the unwatched episode during the time period.

13. The method of claim 9, further comprising:
determining, based on the user viewing history, one or more users with similar user viewing histories, wherein determining the third content item is further based on one or more consumption scores, of the one or more users, for the third content item.

14. The method of claim 9, wherein the determining the third content item comprises:
receiving, by the computing device, a plurality of characters of an input search string for a media search;
determining, based on a character count of the plurality of characters satisfying a threshold, a relative weighting between media providers and media assets for the media search; and
conducting the media search based on the relative weighting.

15. The method of claim 14, further comprising:
ordering, for display and based on determining that the character count of the plurality of characters satisfies the threshold, search results for the media providers before search results for the media assets.

16. The method of claim 2, further comprising:
causing, by the computing device, output of a display of an interface comprising the user viewing schedule, wherein the user viewing schedule comprises content listings for the plurality of content items that the user is predicted to view and a content listing for the third content item, and wherein the content listing for the third content item is arranged in the user viewing schedule at a first time corresponding to the timeslot.

17. A method comprising:
determining, by a computing device, a first content asset and a second content asset that are scheduled for future transmission and that a user is predicted to view;
determining, by the computing device, a first duration of a time period between scheduled transmission times of the first content asset and the second content asset;
determining, based on the first duration, one or more recommended content assets;
determining, by the computing device, a third content asset of the one or more recommended content assets based on a comparison of the first duration and a second duration of the third content asset; and
causing output of the third content asset after the first content asset and during the time period.

18. The method of claim 17, wherein the determining the third content asset further comprises:
monitoring, for each of a plurality of different user devices associated with the user, viewing of content by the user at that user device; and
selecting a different third content asset for each user device of the plurality of different user devices, wherein each different third content asset is based on content that has been viewed at that user device.

19. The method of claim 17, wherein the determining the third content asset further comprises:
receiving, by the computing device, a user input to view successive episodes of a recurring series of episodes corresponding to the second content asset; and
determining, by the computing device, an unwatched episode that precedes the second content asset in the recurring series of episodes.

20. The method of claim 17, wherein the determining the third content asset further comprises:
receiving, by the computing device, a plurality of characters of an input search string for a media search;
determining, based on a character count of the plurality of characters satisfying a threshold, a relative weighting between media providers and media assets for the media search; and
performing the media search based on the relative weighting.

* * * * *

UNITED STATES PATENT AND TRADEMARK OFFICE
CERTIFICATE OF CORRECTION

PATENT NO. : 10,284,916 B2
APPLICATION NO. : 14/547363
DATED : May 7, 2019
INVENTOR(S) : Amit Bagga et al.

Page 1 of 1

It is certified that error appears in the above-identified patent and that said Letters Patent is hereby corrected as shown below:

On the Title Page

Item (72) Inventors, Line 4:
Please delete "Hassan Sayyadi-Harikandehei" and insert --Hans Sayyadi--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*